(12) United States Patent
Asano

(10) Patent No.: US 7,720,849 B2
(45) Date of Patent: May 18, 2010

(54) INFORMATION PROCESSING DEVICE, INFORMATION PROCESSING METHOD, PROGRAM, AND RECORDING MEDIUM

(75) Inventor: Yasuharu Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 11/368,870

(22) Filed: Mar. 6, 2006

(65) Prior Publication Data

US 2006/0217962 A1    Sep. 28, 2006

(30) Foreign Application Priority Data

Mar. 8, 2005    (JP) ............... 2005-063674

(51) Int. Cl.
*G06F 7/00* (2006.01)
*G06F 17/30* (2006.01)
(52) U.S. Cl. .................................. 707/739
(58) Field of Classification Search ............ 704/4, 704/263; 707/100, 102, 104.1, 3, 6
See application file for complete search history.

(56) References Cited

U.S. PATENT DOCUMENTS

| | | | | |
|---|---|---|---|---|
| 6,138,272 A * | 10/2000 | Tonouchi | ............. | 717/142 |
| 6,460,036 B1 * | 10/2002 | Herz | ............. | 707/10 |
| 6,615,208 B1 * | 9/2003 | Behrens et al. | ............. | 707/5 |
| 7,117,208 B2 * | 10/2006 | Tamayo et al. | ............. | 707/6 |
| 7,231,419 B1 * | 6/2007 | Gheorghe et al. | ............. | 709/203 |
| 2002/0095411 A1 * | 7/2002 | Caldwell et al. | ............. | 707/5 |
| 2002/0116207 A1 * | 8/2002 | Kido et al. | ............. | 705/1 |
| 2005/0125307 A1 * | 6/2005 | Hunt et al. | ............. | 705/26 |
| 2005/0149502 A1 * | 7/2005 | McSherry | ............. | 707/3 |
| 2006/0059141 A1 * | 3/2006 | Yonezawa | ............. | 707/5 |
| 2007/0143128 A1 * | 6/2007 | Tokarev et al. | ............. | 705/1 |

* cited by examiner

*Primary Examiner*—James Trujillo
*Assistant Examiner*—Jorge A Casanova
(74) *Attorney, Agent, or Firm*—Frommer Lawrence & Haug LLP; William S. Frommer; Thomas F. Presson

(57) ABSTRACT

An information processing device that includes a referring unit configured to refer to a table in which a characteristic of each piece of first information is expressed as distribution of model parameters in a plurality of semantic classes. The semantic classes are in units of pieces of the first information. An obtaining unit is configured to obtain second information to be searched. A calculating unit is configured to calculate similarities between the second information and the respective pieces of the first information. A first reading unit is configured to read the pieces of the first information from the table in descending order of the similarity.

16 Claims, 16 Drawing Sheets

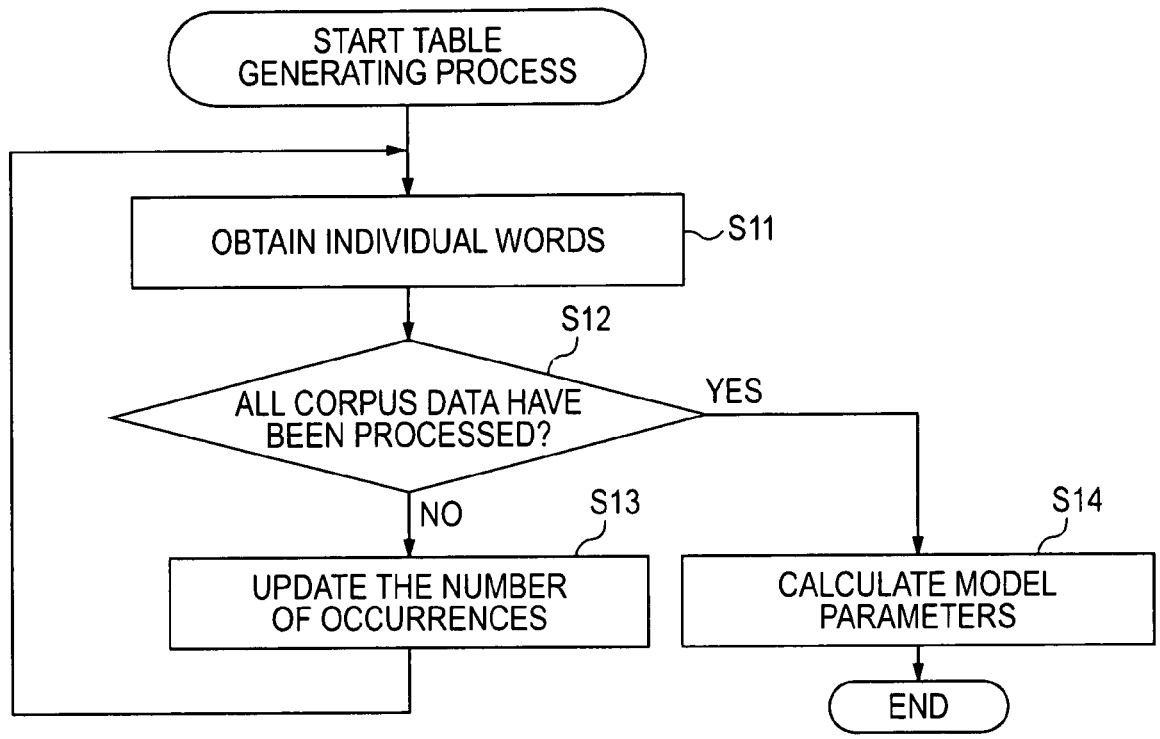

FIG. 5

| CLASS / WORD | z1 | z2 | z3 | ... | zm |
|---|---|---|---|---|---|
| WORD w1 | p(z1/w1) | p(z2/w1) | p(z3/w1) | ...... | p(zm/w1) |
| WORD w2 | p(z1/w2) | p(z2/w2) | p(z3/w2) | ...... | p(zm/w2) |
| ...... | ...... | ...... | ...... | ...... | ...... |
| WORD wn | p(z1/wn) | p(z2/wn) | p(z3/wn) | ...... | p(zm/wn) |

61

FIG. 6
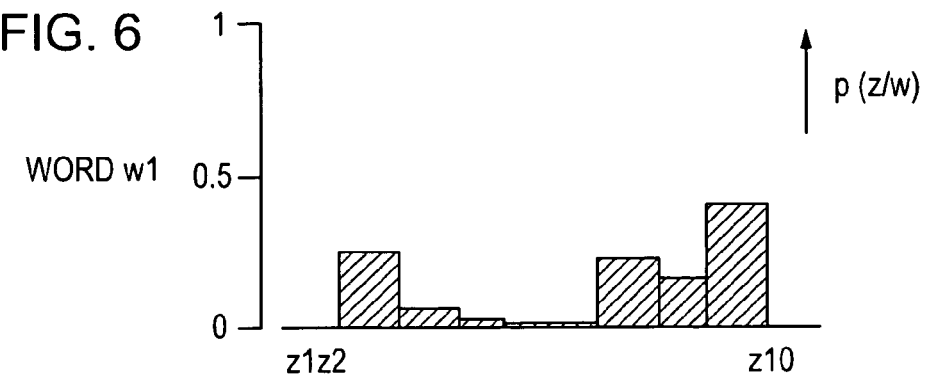
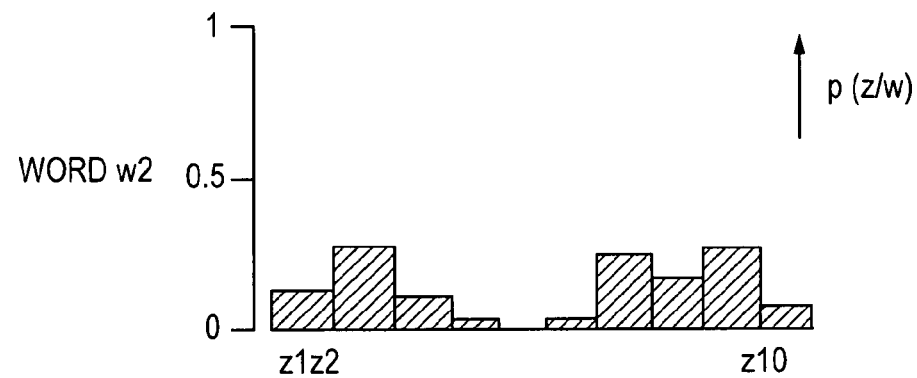
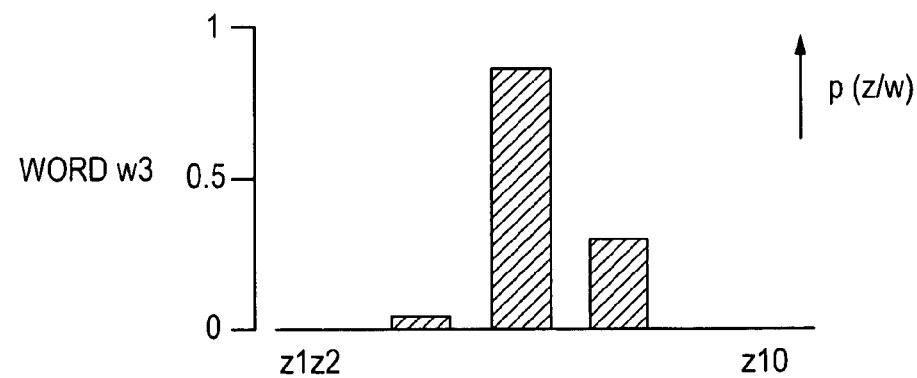
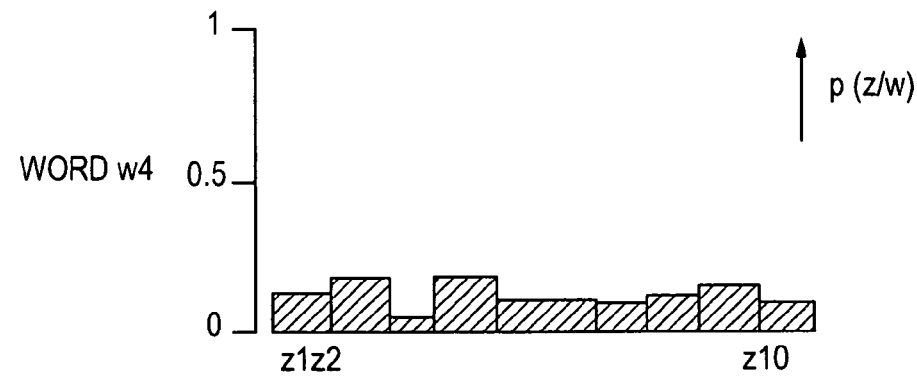

FIG. 7

E-step $$p(z|d,w) = \frac{p(z)p(d|z)p(w|z)}{\sum_{z'} p(z')p(d|z')p(w|z')} \quad \cdots (4)$$

M-step $$p(w|z) = \frac{\sum_{d} n(d,w)p(z|d,w)}{\sum_{d,w'} n(d,w')p(z|d,w')} \quad \cdots (5)$$

$$p(d|z) = \frac{\sum_{w} n(d,w)p(z|d,w)}{\sum_{d',w} n(d',w)p(z|d',w)} \quad \cdots (6)$$

$$p(z) = \frac{1}{R} \sum_{d,w} n(d,w)p(z|d,w) \quad \cdots (7)$$

$$R = \sum_{d,w} n(d,w) \quad \cdots (8)$$

FIG. 8

RECOMMENDED INFORMATION TABLE (61-1)

| WORD \ CLASS | z1 | z2 | z3 | ... | zm |
|---|---|---|---|---|---|
| WORD w1 | p(z1/w1) | p(z2/w1) | p(z3/w1) | ........... | p(zm/w1) |
| WORD w2 | p(z1/w2) | p(z2/w2) | p(z3/w2) | ........... | p(zm/w2) |
| ........... | ... | ... | ... | ............ | ... |
| WORD wn | p(z1/wn) | p(z2/wn) | p(z3/wn) | ........... | p(zm/wn) |

RECOMMENDATION REASON TABLE (61-2)

| WORD \ CLASS | z1 | z2 | z3 | ... | zm |
|---|---|---|---|---|---|
| WORD w1' | p(z1/w1') | p(z2/w1') | p(z3/w1') | ........... | p(zm/w1') |
| WORD w2' | p(z1/w2') | p(z2/w2') | p(z3/w2') | ........... | p(zm/w2') |
| ........... | ... | ... | ... | ............ | ... |
| WORD wn' | p(z1/wn') | p(z2/wn') | p(z3/wn') | ........... | p(zm/wn') |

MODEL PARAMETER HOLDER (12)

FIG. 9

RECOMMENDED INFORMATION TABLE 61-1

| WORD \ CLASS | z1 | z2 | z3 | ... | zm |
|---|---|---|---|---|---|
| WORD w1 | p(z1/w1) | p(z2/w1) | p(z3/w1) | ... | p(zm/w1) |
| WORD w2 | p(z1/w2) | p(z2/w2) | p(z3/w2) | ... | p(zm/w2) |
| ... | ... | ... | ... | ... | ... |
| WORD wn | p(z1/wn) | p(z2/wn) | p(z3/wn) | ... | p(zm/wn) |

| LIST | 62-1 |
|---|---|
| WORD w1 | |
| WORD w2 | |
| ... | |
| WORD wn | |

RECOMMENDATION REASON TABLE 61-2

| WORD \ CLASS | z1 | z2 | z3 | ... | zm |
|---|---|---|---|---|---|
| WORD w1' | p(z1/w1') | p(z2/w1') | p(z3/w1') | ... | p(zm/w1') |
| WORD w2' | p(z1/w2') | p(z2/w2') | p(z3/w2') | ... | p(zm/w2') |
| ... | ... | ... | ... | ... | ... |
| WORD wn' | p(z1/wn') | p(z2/wn') | p(z3/wn') | ... | p(zm/wn') |

| LIST | 62-2 |
|---|---|
| WORD w1' | |
| WORD w2' | |
| ... | |
| WORD wn' | |

MODEL PARAMETER HOLDER 12

INFORMATION PROCESSING DEVICE, INFORMATION PROCESSING METHOD, PROGRAM, AND RECORDING MEDIUM

CROSS REFERENCES TO RELATED APPLICATIONS

The present invention contains subject matter related to Japanese Patent Application JP 2005-063674 filed in the Japanese Patent Office on Mar. 8, 2005, the entire contents of which are incorporated herein by reference.

BACKGROUND OF THE INVENTION

1. Field of the Invention

The present invention relates to an information processing device, an information processing method, a program, and a recording medium. Particularly, the present invention relates to an information processing device, an information processing method, a program, and a recording medium that are favorably used to recommend predetermined information to a user.

2. Description of the Related Art

The widespread diffusion of the Internet has enabled users to easily search for desired information. Also, purchase of items at a shop on the Internet (a so-called net shopping) has become widespread.

For example, a user searches for a shop that sells a necessary item on the Internet, determines the shop on the Internet on the basis of information provided as a search result, and purchases the item at the shop.

Under these circumstances, the user side wants a function enabling easier search for items, whereas the shop side wants a function enabling more efficient selling of items. In accordance with such a demand, for example, when a user purchases an item, the shop recommends another item related to the purchased item. Accordingly, the user can advantageously know (recognize) the related item(s) and purchase the items at the same time (purchase a plurality of items at one time by saving a trouble). Also, the selling side can efficiently sell items because a plurality of items can be sold at the same time advantageously.

As such a recommending method, Patent Document 1 (Japanese Unexamined Patent Application Publication No. 2002-334256) suggests a method using a collaborative filtering device. In recommendation using the collaborative filtering device, on the basis of personal information such as a history of items purchased by a user (user A), another user (user B) having a history similar to the history of user A is selected. Then, recommended information is selected from the history of the selected user B (for example, information common to the users A and B is selected as recommended information), and the selected information is provided to the user A.

On the other hand, Patent Document 2 (Japanese Unexamined Patent Application Publication No. 2002-215665) suggests a method using content-based filtering. According to this suggestion, a sentence in content is represented as a vector of a keyword, the keyword represented by the vector is weighted in a TF (term frequency)×IDF (invert document frequency) method or the like, and cosine measure in a vector space is used as similarity. Accordingly, similar content is searched for and a search result is recommended to the user side.

SUMMARY OF THE INVENTION

In the above-described recommending methods, similarity between histories of users or similarity between keyword vectors is used as a distance scale, and information of highest similarity is selected and recommended. Thus, a reason why the information is recommended is difficult to be presented to the user. In other words, for example, if a recommendation reason "Content A is recommended because of its high similarity" is presented to the user, such information is not useful to the user.

As a result, it is possible that the user cannot recognize the reason why content A is recommended.

As in Patent Document 1, in a case where the history of user A is used to search for recommended information, if the history of user A is not accumulated or if the accumulated amount has not reached a predetermined amount, the accuracy of selecting recommended information (e.g., the possibility of recommending information that is really required by user A) cannot be enhanced. Of course, if a large amount of history of users except user A has not been accumulated, information to be recommended cannot be searched for.

Furthermore, since personal information including history of users is used, there is a high probability that problems occur in terms of privacy, management or operation of personal information, and so on.

The present invention has been made in view of these circumstances and is directed to presenting (recommending) information related to predetermined information to a user more accurately. Also, the present invention is directed to presenting information indicating why the information is recommended (recommendation reason) together with the recommended information.

An information processing device according to a first embodiment of the present invention includes a referring unit configured to refer to a table in which a characteristic of each piece of first information is expressed as distribution of model parameters in a plurality of semantic classes, in units of pieces of the first information; an obtaining unit configured to obtain second information to be searched for; a calculating unit configured to calculate similarities between the second information and the respective pieces of the first information; and a first reading unit configured to read the pieces of the first information from the table in descending order of the similarity.

The information processing device further includes an extracting unit configured to extract the semantic classes in descending order of model parameter of the first information read by the first reading unit; and a second reading unit configured to read the pieces of the first information from the table in descending order of model parameter in the semantic classes extracted by the extracting unit.

The first information read by the first reading unit is recommended information that is recommended to a user as information related to the second information. The first information read by the second reading unit is information provided to the user as a recommendation reason indicating why the recommended information is recommended.

The first reading unit calculates similarities between the read first information or second information and the pieces of the first information written in the table and further reads the pieces of the first information from the table in descending order of the similarity.

If the obtaining unit obtains a plurality of pieces of the second information, the calculating unit calculates similarities for the respective pieces of the second information and calculates the sum of the similarities.

If the obtaining unit obtains a plurality of pieces of the second information, the calculating unit superimposes distributions of model parameters corresponding to the pieces of the second information and calculates similarity to the first information by using the superimposed distribution of model parameters.

The table referred to by the referring unit describes only the first information except information that is inappropriate to be presented to the user.

An information processing method according to the first embodiment of the present invention includes the steps of: referring to a table in which a characteristic of each piece of first information is expressed as distribution of model parameters in a plurality of semantic classes, in units of pieces of the first information; obtaining second information to be searched for; calculating similarities between the second information and the respective pieces of the first information; and reading the pieces of the first information from the table in descending order of the similarity.

A program according to the first embodiment of the present invention includes the steps of: referring to a table in which a characteristic of each piece of first information is expressed as distribution of model parameters in a plurality of semantic classes, in units of pieces of the first information; obtaining second information to be searched for; calculating similarities between the second information and the respective pieces of the first information; and reading the pieces of the first information from the table in descending order of the similarity.

A recording medium according to the first embodiment of the present invention stores a computer-readable program including the steps of: referring to a table in which a characteristic of each piece of first information is expressed as distribution of model parameters in a plurality of semantic classes, in units of pieces of the first information; obtaining second information to be searched for; calculating similarities between the second information and the respective pieces of the first information; and reading the pieces of the first information from the table in descending order of the similarity.

In the information processing device, information processing method, and program according to the first embodiment of the present invention, a database managing information expressed by distribution of model parameters of respective semantic classes is referred to, and information related to information supplied from a used is extracted. Furthermore, other information related to the extracted information is extracted by referring to the database.

An information processing device according to a second embodiment of the present invention includes a referring unit configured to refer to a table in which a characteristic of each piece of first information is expressed as distribution of model parameters in a plurality of semantic classes, in units of pieces of the first information; an obtaining unit configured to obtain second information to be searched for; an extracting unit configured to extract the semantic classes in descending order of model parameter of the second information; and a reading unit configured to read the pieces of the first information from the table in descending order of model parameter in the semantic classes extracted by the extracting unit.

The reading unit extracts the semantic classes in descending order of model parameter of the read pieces of the first information and further reads the pieces of the first information from the table in descending order of model parameter in the extracted semantic classes.

An information processing method according to the second embodiment of the present invention includes the steps of: referring to a table in which a characteristic of each piece of first information is expressed as distribution of model parameters in a plurality of semantic classes, in units of pieces of the first information; obtaining second information to be searched for; extracting the semantic classes in descending order of model parameter of the second information; and reading the pieces of the first information from the table in descending order of model parameter in the semantic classes extracted in the extracting step.

A program according to the second embodiment of the present invention includes the steps of: referring to a table in which a characteristic of each piece of first information is expressed as distribution of model parameters in a plurality of semantic classes, in units of pieces of the first information; obtaining second information to be searched for; extracting the semantic classes in descending order of model parameter of the second information; and reading the pieces of the first information from the table in descending order of model parameter in the semantic classes extracted in the extracting step.

A recording medium according to the second embodiment of the present invention stores a computer-readable program including the steps of: referring to a table in which a characteristic of each piece of first information is expressed as distribution of model parameters in a plurality of semantic classes, in units of pieces of the first information; obtaining second information to be searched for; extracting the semantic classes in descending order of model parameter of the second information; and reading the pieces of the first information from the table in descending order of model parameter in the semantic classes extracted in the extracting step.

In the information processing device, information processing method, and program according to the second embodiment of the present invention, a database managing information expressed by distribution of model parameters of respective semantic classes is referred to, and information related to information supplied from a used is extracted. Furthermore, other information related to the extracted information is extracted by referring to the database.

According to the present invention, recommended information can be set.

According to the present invention, information desired by a user (information satisfying user's preference) can be recommended. Further, the accuracy of the recommended information can be enhanced.

According to the present invention, a recommendation reason indicating why the recommended information is recommended can be presented to the user side.

According to the present invention, information can be presented to the user side more effectively.

BRIEF DESCRIPTION OF THE DRAWINGS

FIG. 3 is a flowchart illustrating learning performed by the learning device;

FIG. 4 illustrates a generated table;

FIG. 5 illustrates a generated table;

FIG. 6 shows data in the generated table in the form of graphs;

FIG. 7 illustrates an EM algorithm;

FIG. 8 illustrates tables held in a model parameter holder;

FIG. 9 illustrates other tables held in the model parameter holder;

DESCRIPTION OF THE PREFERRED EMBODIMENTS

Before describing embodiments of the present invention, the correspondence between the disclosed invention and embodiments of the present invention is discussed below. Even if an embodiment in the specification is not described as relating to a certain feature of the present invention, that does not necessarily mean that the embodiment does not relate to that feature of the invention. Conversely, even if an embodiment is described herein as relating to a certain feature of the invention, that does not necessarily mean that the embodiment does not relate to other features of the invention.

Furthermore, this description should not be construed as restricting that all the aspects of the invention described in the specification are described in the claims. That is, the description does not deny the existence of aspects of the present invention that are described in the specification but not claimed in the invention of this application, i.e., the existence of aspects of the present invention that in future may be claimed by a divisional application, or that may be additionally claimed through amendments.

Figure 10:
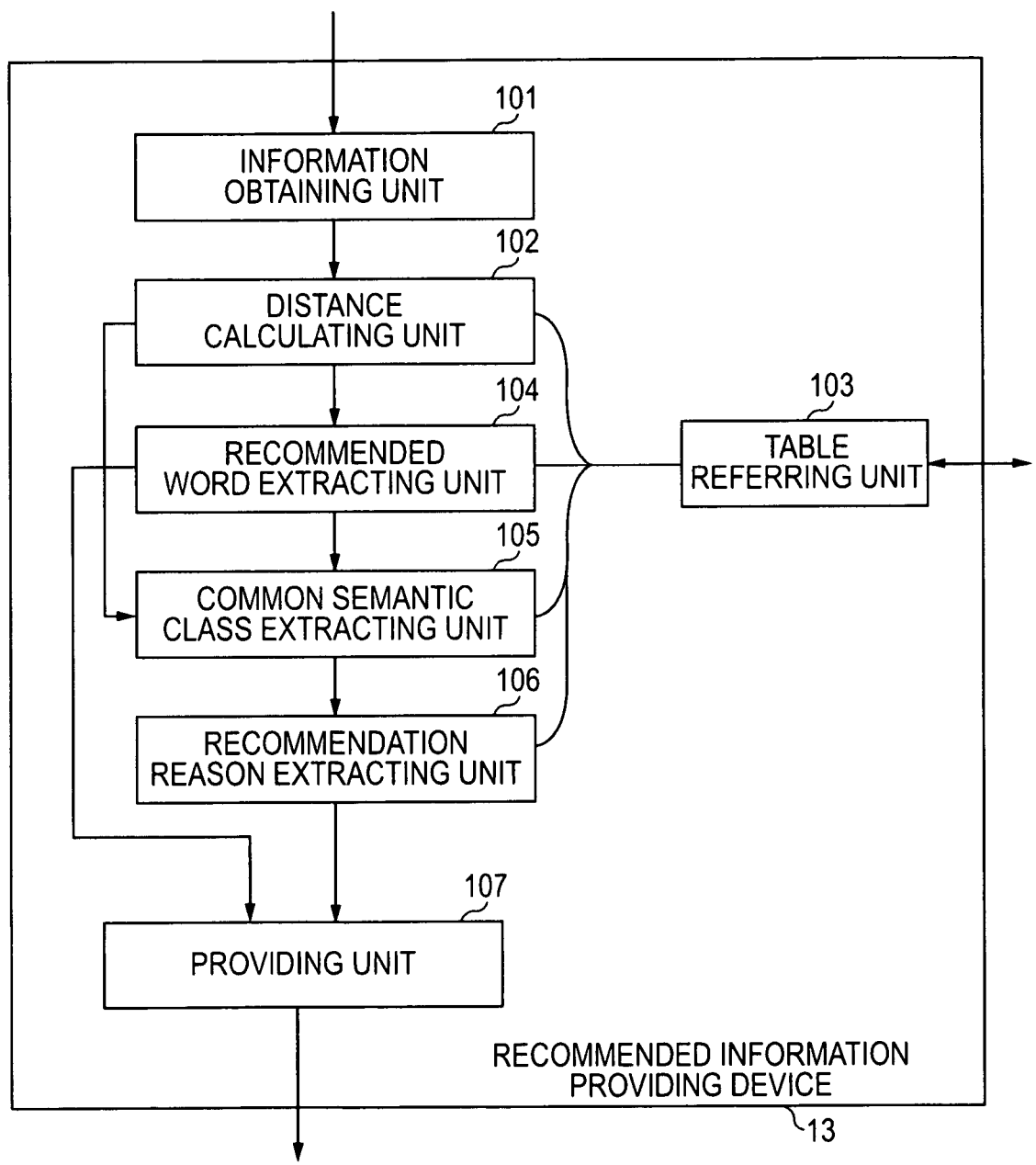
FIG. 10 illustrates an example of an internal configuration of a recommended information providing device.

An information processing device according to an embodiment of the present invention is, for example, the recommended information providing device 13 shown in FIG. 10. The information processing device includes a referring unit (e.g., the table referring unit 103 shown in FIG. 10) configured to refer to a table (e.g., the table 61 shown in FIG. 5) in which a characteristic of each piece of first information is expressed as distribution of model parameters in a plurality of semantic classes, in units of pieces of the first information; an obtaining unit (e.g., the information obtaining unit 101 shown in FIG. 10) configured to obtain second information to be searched for; a calculating unit (e.g., the distance calculating unit 102 shown in FIG. 10) configured to calculate similarities between the second information and the respective pieces of the first information; and a first reading unit (e.g., the recommended word extracting unit 104 shown in FIG. 10) configured to read the pieces of the first information from the table in descending order of the similarity.

The information processing device further includes an extracting unit (e.g., the common semantic class extracting unit 105 shown in FIG. 10) configured to extract the semantic classes in descending order of model parameter of the first information read by the first reading unit; and a second reading unit (e.g., the recommendation reason extracting unit 106 shown in FIG. 10) configured to read the pieces of first information from the table in descending order of model parameter in the semantic classes extracted by the extracting unit.

Hereinafter, embodiments of the present invention are described with reference to the drawings.

[System Configuration]

Figure 1:
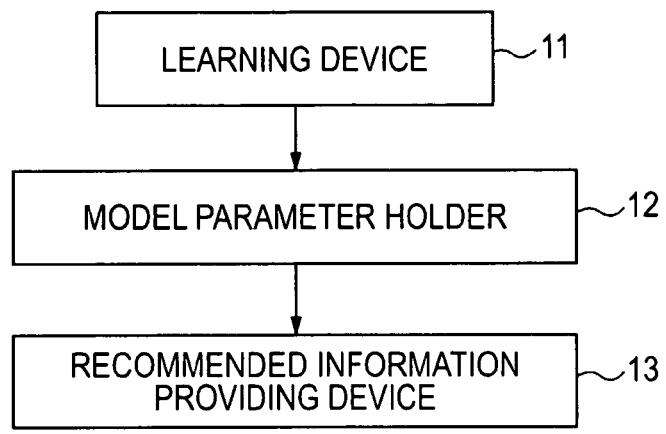
FIG. 1 shows a configuration of a system according to an embodiment of the present invention.

FIG. 1 shows a configuration of a system according to an embodiment of the present invention. The system shown in FIG. 1 recommends information related to predetermined information provided by a user. Also, the system provides a recommendation reason to the user when recommending the information.

A learning device 11 generates model parameters held in a model parameter holder 12. A recommended information providing device 13 refers to the model parameters held in the model parameter holder 12 so as to generate and provide information recommended to a user and information about a reason why the information is recommended.

In FIG. 1 and the following description, the learning device 11, the model parameter holder 12, and the recommended information providing device 13 are separated from each other. However, these devices may be integrated together.

The learning device 11, the model parameter holder 12, and the recommended information providing device 13 may be connected to each other so that data can be mutually transmitted/received through a network (not shown) or the like. In that configuration, model parameters generated by the learning device 11 are transmitted to the model parameter holder 12 through the network and are held therein, and the recommended information providing device 13 refers to the parameters held in the model parameter holder 12 through the network as necessary.

The model parameters generated by the learning device 11 may be recorded on a predetermined recording medium and may be provided to the model parameter holder 12.

Example of Internal Configuration of the Learning Device

Figure 2:
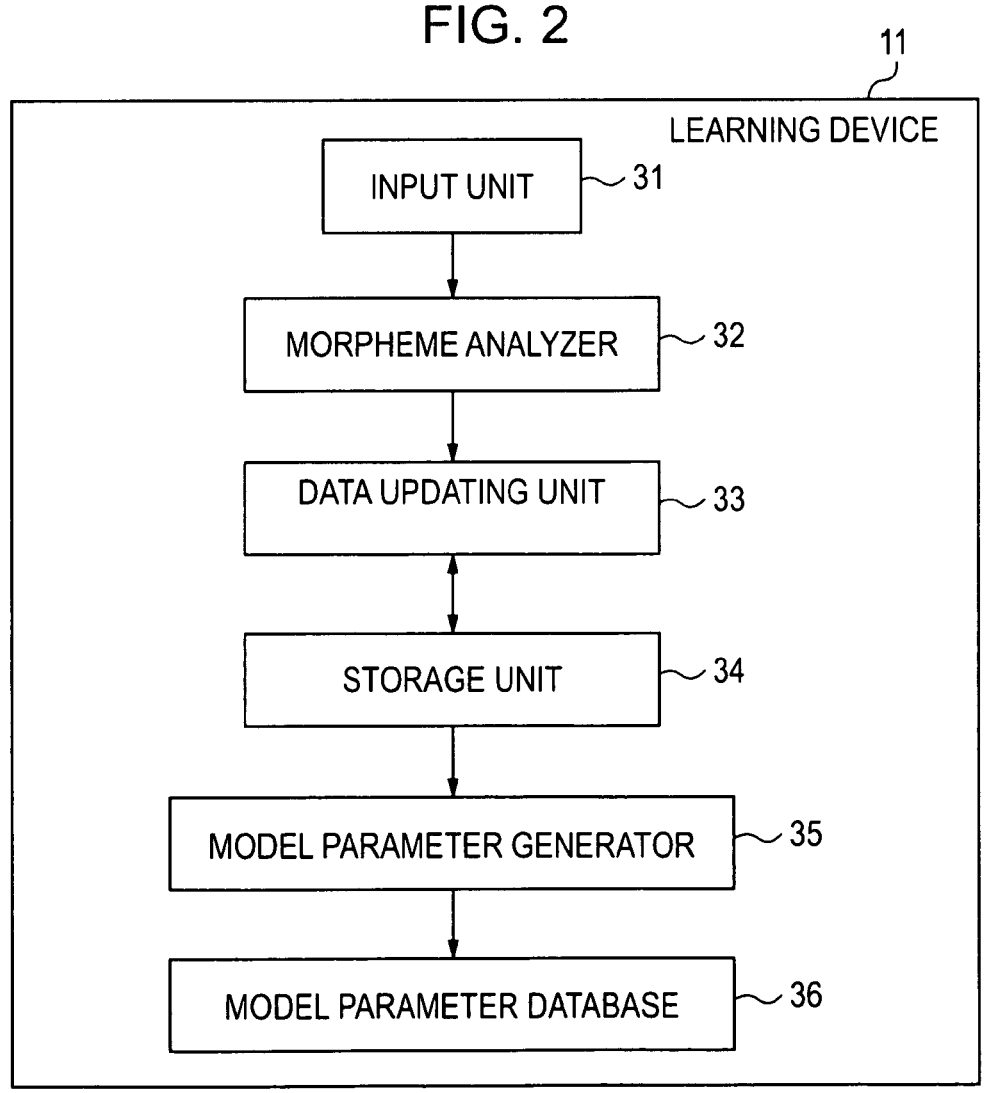
FIG. 2 shows an example of an internal configuration of a learning device.

FIG. 2 shows the configuration of the learning device 11 to generate model parameters (table) held by the model parameter holder 12. An input unit 31 receives text data and the like. The input data is a large amount of learning corpus data. The data input to the input unit 31 is supplied to a morpheme analyzer 32.

In a case where a table about Japanese is generated, the corpus data input to the input unit 31 are Japanese sentences. However, in a Japanese sentence, each word is not separated with a space. Thus, a sentence needs to be divided into words by using a method called morpheme analysis. In this embodiment, the morpheme analysis is performed by the morpheme analyzer 32.

Herein, the learning corpus data includes a profile or a criticism article on a person belonging to a predetermined genre or on his/her work. The learning corpus data dealt here depends on information recommended by the recommended information providing device 13. That is, if the recommended information providing device 13 recommends information about music, a criticism article on a predetermined musician or an album of the musician is used as the learning corpus data. If the recommended information providing device 13 recommends information about books, a criticism article on a predetermined writer or his/her work is used as the learning corpus data.

This is because the same word has different meanings (different nuances) when the word is used in different genres.

For example, when a word "warm" is used in a music genre, it can be understood that "warm" expresses a mental warmness of a ballad or the like. On the other hand, when the word "warm" is used in an article of newspaper, it can be understood that the word describes weather forecast and that "warm" is physically warm.

In this way, the same word can be used in different meanings. Considering such a case, learning corpus data should be changed depending on recommended information in order to generate model parameters that are referred to when a process relating to setting of recommended information in the recommended information providing device 13 (described below) is executed.

Referring back to the description about the configuration of the learning device 11 shown in FIG. 2, the data output from the morpheme analyzer 32 is data about words. Herein, description is given on the assumption that a sentence is divided into words on the basis of a method of morpheme analysis, but another analyzing method may be used.

The data about words output from the morpheme analyzer 32 is supplied to a data updating unit 33. The data updating unit 33 is provided to update data stored in a storage unit 34. The storage unit 34 stores data about the number of occurrences of words included in the corpus data. By using the data stored in the storage unit 34, a model parameter generator 35 calculates model parameters (probability values in a table 61 shown in FIG. 5 (described below)) and generates the table 61 shown in FIG. 5. The generated table 61 is stored in a model parameter database 36.

The table 61 stored in the model parameter database 36 is distributed through a network, a predetermined recording medium, or through another method, so that the table 61 is supplied to the model parameter holder 12 and is held therein.

[Learning in the Learning Device]

Now, a learning method (method for generating the table 61) executed by the learning device 11 shown in FIG. 2 is described with reference to the flowchart shown in FIG. 3. In step S11, learning corpus data is input to the input unit 31 and is supplied to the morpheme analyzer 32, where the corpus data is divided into individual words. Data about the words output from the morpheme analyzer 32 is supplied to the data updating unit 33.

On the other hand, in step S12, it is determined whether all of the learning corpus data input to the input unit 31 have been processed. Alternatively, step S12 may be performed by the input unit 31 by determining whether data is not input any more.

If it is determined in step S12 that not all of the learning corpus data have been processed, the process proceeds to step S13, where the number of occurrences of words to be processed (words output from the morpheme analyzer 32 at that time) is updated. For example, a table 51 shown in FIG. 4 is stored in the storage unit 34. In the table 51, predetermined sentences are managed along the horizontal axis, whereas words are managed along the vertical axis. At each intersection of a sentence and a word, the number of occurrences of a predetermined word in a predetermined sentence is written.

For example, in the table 51 shown in FIG. 4, word 1 occurs five times in sentence 1, whereas word 2 occurs once in sentence 1. In this way, the number of occurrences of each word in a sentence is managed.

Before updating the table 51, the data updating unit 33 determines whether the word to be processed has already been stored in the storage unit 34 (whether the word has been registered in the table 51). If it is determined that the word to be processed has been stored in the table 51, the data updating unit 33 increments the number of occurrences associated with the stored word and associated with the sentence to be processed by one. On the other hand, if it is determined that the word to be processed has not been stored in the storage unit 34, the data updating unit 33 newly registers the word and sets the number of occurrences of the word to one.

For example, assume that the sentence to be processed is sentence 1 and that the word to be processed is word N. In this case, if word N has been registered in the table 51, the value written at the intersection of sentence 1 and word N is incremented by one. If word N has not been registered in the table 51, word N is newly registered and a value "1" is written at the intersection of word N and sentence 1.

Learning is performed through repetition of the above-described steps S11 to S13.

If it is determined in step S12 that all of the learning corpus data have been processed, the process proceeds to step S14. In step S14, the model parameter generator 35 calculates model parameters. The model parameter generator 35 refers to the table 51 stored in the storage unit 34 and calculates probabilistic language model parameters (probability values in the table 61 shown in FIG. 5) by using, for example, a PLSA (probabilistic latent semantic analysis) method. The details of step S14 are described below with reference to FIGS. 5 and 6.

Each of calculated probability values is associated with a semantic class ID and a corresponding word. The table 61 shown in FIG. 5 is generated through this process. The generated table 61 is stored in the model parameter database 36. Then, the table 61 stored in the model parameter database 36 is held in the model parameter holder 12.

Now, the table 61 shown in FIG. 5 is further described. In the table 61 shown in FIG. 5, semantic classes are set along the horizontal axis, whereas words are set in the vertical axis. At the intersections thereof, probability values of the respective words in the corresponding semantic classes are written. For example, the probability value of word w1 in semantic class z1 is p(z1|w1).

Hereinafter, semantic classes and probability values (model parameters) are described with reference to FIG. 6. FIG. 6 includes graphs showing parameters about words w1, w2, w3, and w4. In each graph shown in FIG. 6, the vertical axis indicates the value p(z|w) and the horizontal axis indicates semantic classes. In addition, in each graph shown in FIG. 6, the number of semantic classes is set to z=10.

The semantic class is not a class recognizable by people, such as a specific genre, but is set to characterize a word or context in order to set recommended information or select a recommendation reason, which will be described below.

"p(z|w)" indicates a value of conditional probability of occurrence of meaning class z under the condition where word w occurs. "p(z|w)" is calculated in the following expression (1).

[Expression 1]

$$p(z|w) = \frac{p(w|z)p(z)}{p(w)} \propto p(w|z)p(z) \tag{1}$$

As can be understood from expression (1), "p(z|w)" is calculated on the basis of "p(w|z)" and "p(z)". "p(w|z)" and "p(z)" are calculated in the following expressions (2) and (3) used in an M-step in an EM (expectation-maximization) algorithm.

[Expression 2]

$$p(w|z) = \frac{\sum_{d} n(d, w) p(z|d, w)}{\sum_{d,w'} n(d, w') p(z|d, w')} \quad (2)$$

[Expression 3]

$$p(z) = \frac{1}{R} \sum_{d,w} n(d, w) p(z|d, w) \quad (3)$$

That is, attribution probability distribution "p(z|w)" of a word to semantic classes can be calculated on the basis of "p(w|z)" and "p(z)". By calculating the attribution probability distribution to semantic classes, a semantic outline of word w can be expressed.

The EM algorithm is an operation composed of E-step and M-step shown in FIG. 7. The parameters "p(z)", "p(w|z)", and "p(d|z)" in expressions (1) to (3) are optimized by using the EM algorithm shown in FIG. 7 including expressions (4) to (8) (expression (5) is expression (2), and expression (7) is expression (3)).

Calculation of model parameters in step S14 is performed through repeated operations using E-step and M-step of the EM algorithm.

Referring to FIG. 6, word w1 and word w2 are similar in distribution pattern and have much in common semantically. For example, as can be seen in the graphs, high attribution probability is given to common semantic classes z2 and z9. In contrast, word w3 is different from words w1 and w2 in distribution pattern and has few in common semantically. For example, as can be seen in the graph of word w3, high attribution probability is not given to the semantic classes that are common to those of words w1 and w2.

Referring to the graph of word w4, the attribution probability values of respective semantic classes are even, and no semantic class has an especially high probability value. Such a graph corresponds to a function word, such as "suru" and does not express a specific meaning (a word whose characteristic cannot be expressed with probability values of one or more semantic classes and that cannot be classified on the basis of distribution of probability values).

As described above, in the semantic probability distribution p(z|w) of word w, probability values are significantly different in respective semantic classes when the word is semantically characteristic (characteristic can be seen in the distribution itself). However, probability values are even in all semantic classes when the word is not semantically characteristic, e.g., when the word is a function word.

The semantic probability distribution p(z|w) of word w has the above-described characteristic. In the example shown in FIG. 6, the number of semantic classes is set to ten. If the number of semantic classes is set to more than ten so that the word can be analyzed in more detail, the characteristic of the word can be expressed more definitely.

By listing the data of association between semantic classes and probability values (model parameters) of each word shown in FIG. 6 in a table, the table 61 shown in FIG. 5 can be obtained.

As a word held in the table 61, a postposition and an auxiliary verb such as "wa" and "shinai" are inappropriate as information to be provided to a user. That is, the table 61 is referred to when the recommended information providing device 13 sets information recommended to a user and a recommendation reason. The words written in the table 61 are presented to the user, and thus a postposition and an auxiliary verb are inappropriate as the presented information.

After step S14 has been done, that is, after the table 61 shown in FIG. 5 has been generated, words that should not be provided to the user, such as a postposition and an auxiliary verb, may be deleted from the table 61. In that case, the words to be deleted are not limited to a postposition and an auxiliary verb.

Alternatively, after the table 61 has been generated, unnecessary words may be manually deleted from the table 61.

The table 61 generated (learned) in this way is held by the model parameter holder 12.

The following description is made on the assumption that the model parameter holder 12 holds two tables: a table 61-1 and a table 61-2, as shown in FIG. 8. The table 61-1 is a table in which information recommended to a user is written. The table 61-2 is a table in which recommendation reasons are written. In the respective tables 61-1 and 61-2, words are associated with semantic class IDs, as in the table 61 shown in FIG. 5.

In the following description, the table 61-1 is called a recommended information table 61-1 and the table 61-2 is called a recommendation reason table 61-2. Also, the following description is made on the assumption that information about music is provided (recommended) to a user. When information about music is recommended to a user, the words written in the recommended information table 61-1 (recommended information, such as words w1 and w2) include the name of an artist (the name of a musician) or the title of a song. On the other hand, the words written in the recommendation reason table 61-2 (information about recommendation reasons, such as words w1' and w2') include adjectives to describe the artist.

Herein, the model parameter holder 12 holds the recommended information table 61-1 and the recommendation reason table 61-2. However, of course, these tables may be managed as a single table. When these tables are managed as a single table, the first to n-th pieces of information are used as the recommended information table 61-1, and the rest is used as the recommendation reason table 61-2.

Also, the description is made on the assumption that the two tables are held in the model parameter holder 12, but lists to refer to these two tables may further be managed. For example, as shown in FIG. 9, the model parameter holder 12 may further hold a list 62-1 composed of the words written in the recommended information table 61-1 and a list 62-2 composed of the words written in the recommendation reason table 61-2.

In a case where the lists 62-1 and 62-2 are provided as shown in FIG. 9, or where unnecessary words are manually deleted from the table 61 after the table 61 has been generated by the learning device 11, a user who performs that process can recognize the words managed in the recommended information table 61-1 and the recommendation reason table 61-2 only by referring to the lists 62-1 and 62-2, so that the user can easily delete unnecessary words.

As described above, the tables held in the model parameter holder 12 can be adequately modified.

Hereinafter, the recommended information providing device 13 that executes a process by using the tables held in the model parameter holder 12 is described in more detail.

[Configuration of the Recommended Information Providing Device]

FIG. 10 shows an example of an internal configuration of the recommended information providing device 13. The recommended information providing device 13 includes an information obtaining unit 101 to obtain information provided by a user. Herein, for example, information is provided by a user and information corresponding to (related to) the information is provided (recommended) to the user. As described above, the information provided (recommended) to the user is information about music. Thus, the information provided by the user is also information about music.

For example, assume that the recommended information providing device 13 is provided in a shop (server) run on a network, that a user (customer) purchases a CD (compact disc) of a predetermined artist at the shop, and that information about the predetermined artist is used as information provided by the user. In this case, the information obtaining unit 101 obtains the information from the user through a network (not shown) and thus includes a communication unit capable of transmitting/receiving data through the network.

If the recommended information providing device 13 is provided in an apparatus on the user side (e.g., a terminal such as a personal computer), the information obtaining unit 101 includes an operating unit to accept information from the user (instructions from the user), such as a keyboard and a mouse.

The information provided by the user may include information to be searched for, for example, information input when the user wants to search for similar information, in addition to information input by the user with an intention to purchase an item.

The information from the user obtained by the information obtaining unit 101 is supplied to a distance calculating unit 102. Also, information from the recommended information table 61-1 (FIG. 8) referred to by a table referring unit 103 is supplied to the distance calculating unit 102. Although the details are described below, the distance calculating unit 102 calculates the distances between the information from the information obtaining unit 101 and the words written in the recommended information table 61-1. A calculation result is supplied to a recommended word extracting unit 104.

The recommended word extracting unit 104 refers to the calculation result supplied from the distance calculating unit 102 and extracts a word at the shortest distance. In other words, the recommended word extracting unit 104 extracts information (word) that is determined to be most similar to the information from the user obtained by the information obtaining unit 101, from the recommended information table 61-1.

The information about the word extracted by the recommended word extracting unit 104 is supplied to a common semantic class extracting unit 105. The common semantic class extracting unit 105 extracts a semantic class common to the information from the user and the information from the recommended word extracting unit 104 and supplies information indicating the extracted semantic class to a recommendation reason extracting unit 106.

The recommendation reason extracting unit 106 extracts a word serving as a recommendation reason by using the information indicating the semantic class supplied from the common semantic class extracting unit 105 and by referring to the information written in the recommendation reason table 61-2 referred to by the table referring unit 103. The word extracted by the recommendation reason extracting unit 106 is supplied to a providing unit 107. The providing unit 107 provides the recommended information that is extracted by the recommended word extracting unit 104 and the recommendation reason extracted by the recommendation reason extracting unit 106 to the user.

The providing unit 107 and the information obtaining unit 101 function in a pair. That is, when the recommended information providing device 13 is provided in a server on a network, the providing unit 107 includes a communication unit and provides information to a user terminal by controlling the communication unit. The user terminal displays the provided information on a display so as to present the information to the user. When the recommended information providing device 13 is provided in the user terminal, the providing unit 107 includes a display unit such as a display (not shown) and provides information to the user by controlling the display unit.

An operation of the recommended information providing device 13 having the above-described configuration is described below.

[Operation of the Recommended Information Providing Device]

Figure 11:
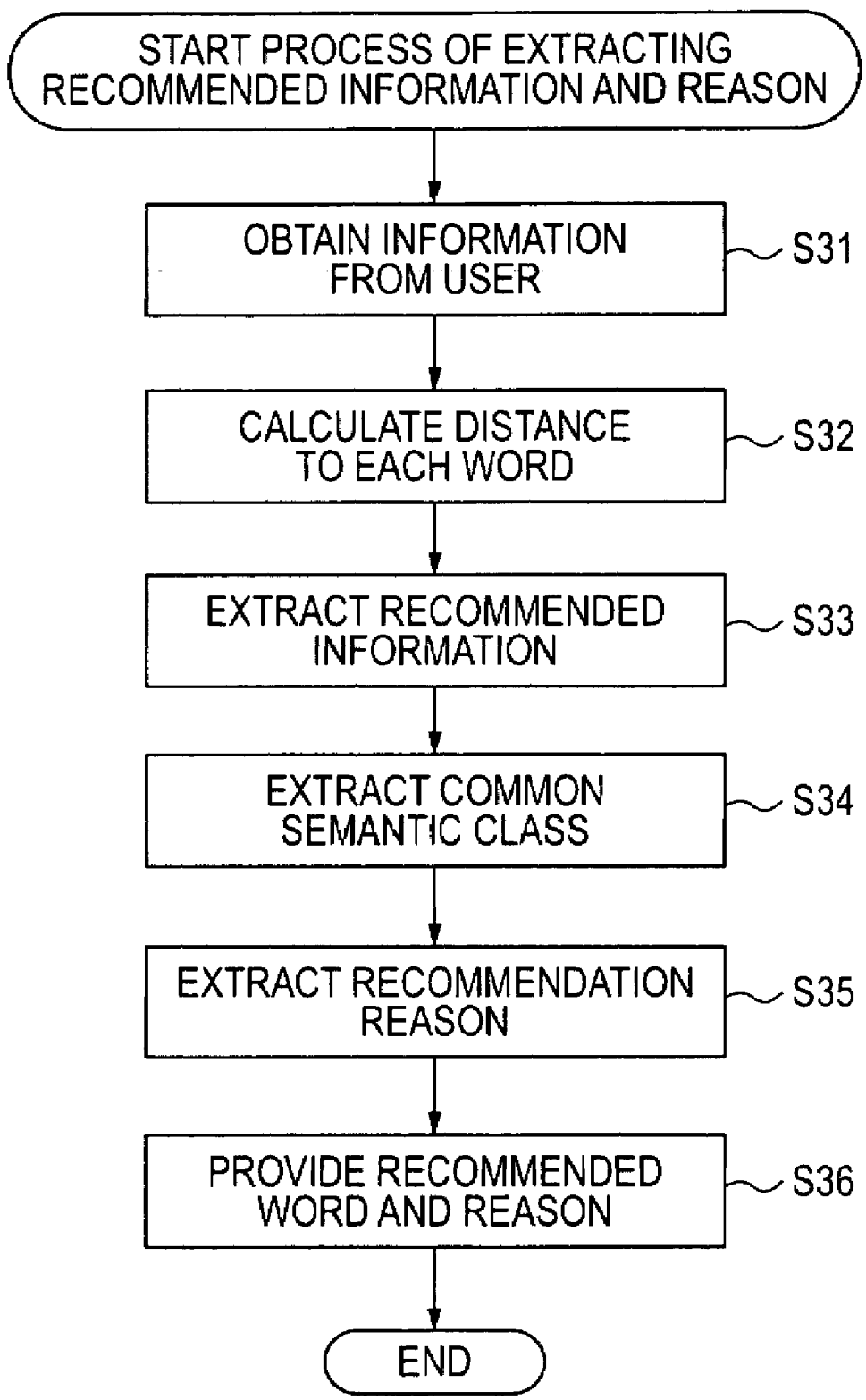
FIG. 11 is a flowchart illustrating an operation of the recommended information providing device.

FIG. 11 is a flowchart illustrating an operation of the recommended information providing device 13. In step S31, the information obtaining unit 101 obtains information from a user. The information obtained here is a word, such as the name of an artist. The word, such as the name of an artist, is supplied to the distance calculating unit 102.

In step S32, the distance calculating unit 102 reads information about semantic classes of the supplied word from the recommended information table 61-1. For example, the distance calculating unit 102 provides instructions to the table referring unit 103 to read the recommended information table 61-1 held in the model parameter holder 12. In response to the instructions, the table referring unit 103 reads the recommended information table 61-1 and supplies it to the distance calculating unit 102.

The distance calculating unit 102 refers to the obtained recommended information table 61-1, searches for the word supplied from the user, and reads the model parameters (probability values) of the found word. In this way, the model parameters of the information (word) supplied from the user are read. The read word and model parameters are supplied to the common semantic class extracting unit 105. Also, the distance calculating unit 102 calculates the distances between the word supplied from the user and the respective words written in the recommended information table 61-1 by using the model parameters of the read word.

For example, if the word supplied from the user is word w1, the distance between words w1 and w2 is calculated by using the model parameters of word w1 and the model parameters of word w2. Also, the distance between words w1 and w3 is calculated by using the model parameters of word w1 and the model parameters of word w3. In this way, the distances between the word supplied from the user and the respective words written in the recommended information table 61-1 are calculated.

The distance calculating unit 102 calculates the distances by using, for example, a method of Kullback-Leibler Divergence expressed by the following expression (9).

[Expression 4]

$$D(wi, wj) = \sum_{z \in Z} p(z|wi) \log \frac{p(z|wi)}{p(z|wj)} \quad (9)$$

In a case where the distances are calculated by using expression (9), for example, when the distance between word w1 and word w2 is calculated, the model parameter of semantic class z1 of word w1 is divided by the model parameter of semantic class z1 of word w2, log of the calculated value is obtained, and the value is multiplied by the model parameter of semantic class z1 of word w1. Further, this calculation is performed for each semantic class (calculations are performed ten times if there are ten semantic classes). Then, the values of the respective semantic classes are added, so that the distance between word w1 and word w2 is calculated.

Calculation results generated by the distance calculating unit 102 are sequentially supplied to the recommended word extracting unit 104. The recommended word extracting unit 104 extracts recommended information (word) in step S33.

When the distance calculating unit 102 calculates the distances on the basis of expression (9), it is determined that the distance is shorter as the calculation result is smaller, and that the words are similar to each other as the distance therebetween is shorter. In this case, a word similar to the word supplied from the user is provided as recommended information to the user. The number of words to be provided may be one or more than one. When one or more words are recommended, the words may be provided in ascending order of calculation result.

In this case, the recommended word extracting unit 104 includes a memory to temporarily store calculation results supplied from the distance calculating unit 102. The recommended word extracting unit 104 sorts the calculation results stored in the memory in ascending order of value, and outputs a predetermined number of calculation results to the common semantic class extracting unit 105 (e.g., one calculation result is output if a piece of information is to be provided to the user).

The data output from the recommended word extracting unit 104 to the common semantic class extracting unit 105 is the model parameters of a recommended word (the word that is determined to be the closest and that is read from the recommended information table 61-1), whereas the data output from the recommended word extracting unit 104 to the providing unit 107 is information of the recommended word.

In step S34, the common semantic class extracting unit 105 compares the model parameters of the word supplied from the user with the model parameters of the recommended word and extracts a semantic class in which the parameter is high in both words. As described above, the semantic classes are set to characterize a word. Therefore, the characteristic of two words can be found by comparing the model parameters of the two words and extracting a semantic class in which the model parameter is high in the both two words.

The common semantic class extracting unit 105 may extract only one semantic class of the highest value or a plurality of semantic classes of higher values. If the common semantic class extracting unit 105 extracts only one semantic class, calculation based on expression (10) is performed.

[Expression 5]

$$z = \underset{z}{\mathrm{argmax}}(p(z|u)p(z|r)) \qquad (10)$$

In expression (10), "p(z|u)" represents the model parameter of semantic class z of word u supplied from the user, and "p(z|r)" represents the model parameter of semantic class z of word r (a word written in the recommendation reason table 61-2) to be processed. "p(z|u)" is supplied from the distance calculating unit 102, whereas "p(z|r)" is extracted by the recommended word extracting unit 104.

According to expression (10), the maximum (max) of the product of "p(z|u)" and "p(z|r)" is calculated. Among calculation results based on expression (10), a semantic class having a largest value is supplied as a common semantic class to the recommendation reason extracting unit 106.

In step S35, the recommendation reason extracting unit 106 extracts information (word) to be provided as a recommendation reason to the user. Specifically, the recommendation reason extracting unit 106 provides instructions to the table referring unit 103 to read the recommendation reason table 61-2 (FIG. 8). In response to the instructions, the table referring unit 103 reads the recommendation reason table 61-2 from the model parameter holder 12 and supplies it to the recommendation reason extracting unit 106.

The recommendation reason extracting unit 106 refers to the recommendation reason table 61-2 and searches for a word in which the model parameter (model parameter A) of the semantic class (semantic class A) supplied from the common semantic class extracting unit 105 is high.

The recommendation reason extracting unit 106 may read words having a larger value than the model parameter A from the recommendation reason table 61-2 by referring to only the model parameters of the semantic class A (therefore, a plurality of words can be read), or may read only one word having the highest model parameter. Alternatively, the recommendation reason extracting unit 106 may read a plurality of high-order words.

Anyway, a word (information) as a recommendation reason is read from the recommendation reason table 61-2 by the recommendation reason extracting unit 106 and is supplied to the providing unit 107. The following expression (11) expresses a process performed by the recommendation reason extracting unit 106.

[Expression 6]

$$w = \underset{w}{\mathrm{argmax}}(p(z|w)) \qquad (11)$$

In expression (11), "p(z|w)" represents the model parameter of word w in semantic class z. Information about a common semantic class has been supplied from the common semantic class extracting unit 105 to the recommendation reason extracting unit 106. The semantic class indicated by the supplied information is used as (substituted to) the value of semantic class z in expression (11).

Through an operation based on expression (11), a word having the highest (max) model parameter in the common semantic class z can be extracted. The word extracted in this way is supplied to the providing unit 107.

Accordingly, the providing unit 107 is supplied with the recommended word from the recommended word extracting unit 104 and the word as a recommendation reason from the recommendation reason extracting unit 106.

In step S36, the providing unit 107 provides the recommended word and the recommendation reason to the user. Accordingly, information related to the information input by the user is recommended to the user, and information about the reason why the information is recommended is also provided to the user. As a result, the user provided with the recommended information can understand the relationship between the information input by himself/herself and the recommended information, so that the user can obtain more useful information than in the case where information is simply recommended.

Specific Example about Recommendation

Next, the process performed by the recommended information providing device 13 is described with reference to FIGS. 12 to 16.

Figure 12:
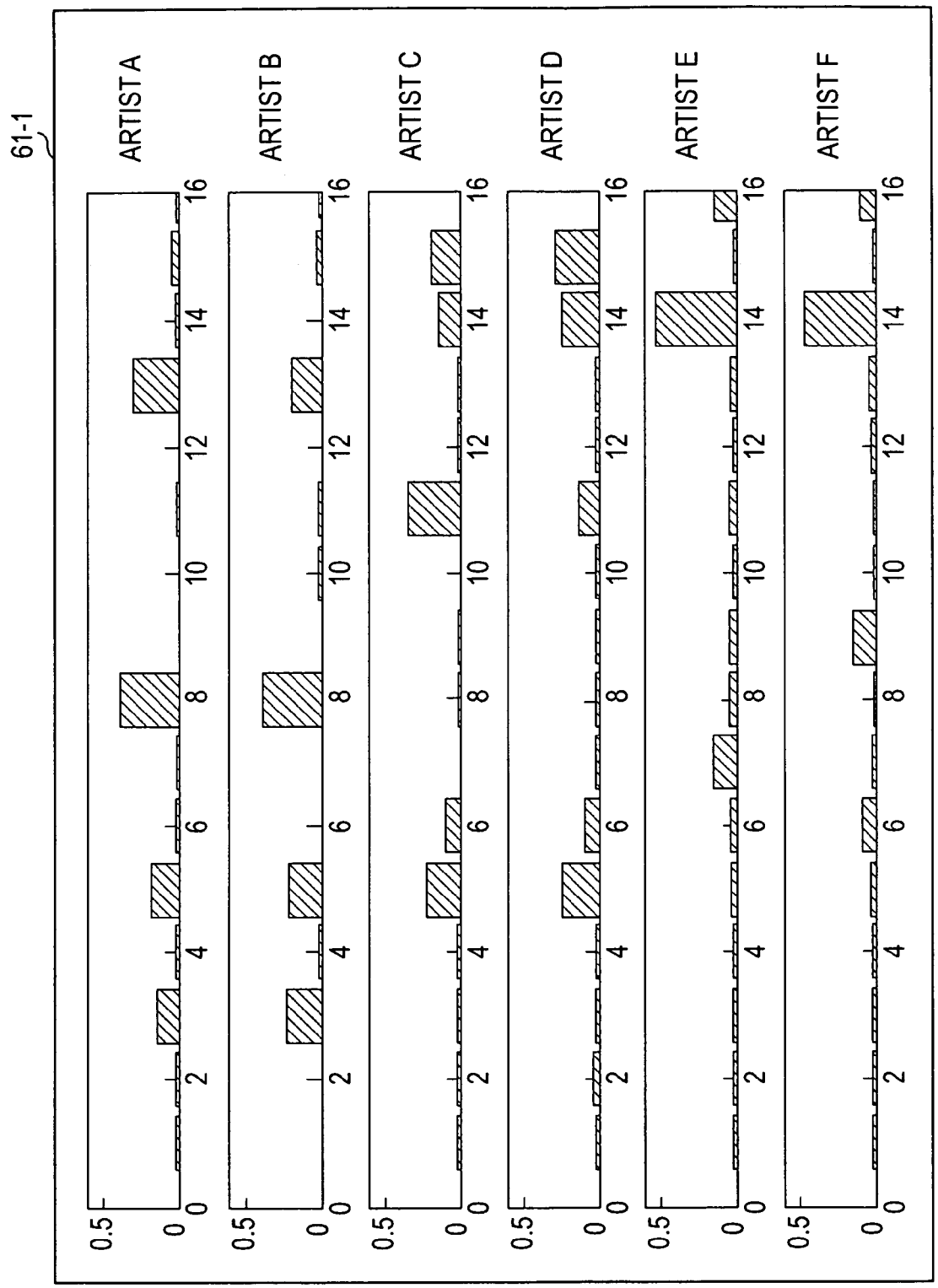
FIG. 12 illustrates a process performed to set recommended information and a reason.

FIG. 12 shows an example of the recommended information table 61-1 held by the model parameter holder 12. In the recommended information table 61-1 shown in FIG. 12, distribution of model parameters is shown in graphs as in FIG. 6 (the data in the table shown in FIG. 8 is expressed in graphs). Also, in FIGS. 13 to 16, distribution of model parameters is shown in graphs. In these graphs, sixteen semantic classes are provided. The horizontal axis indicates the semantic classes and the vertical axis indicates model parameters.

Each graph shown in FIGS. 12 to 16 is generated on the basis of actual data. The graphs shown in FIG. 12 show an example of the recommended information table 61-1. As described above, the recommended information table 61-1 is provided to provide a word (information) that is similar to (related to) the information from the user. In this example, information about music is recommended, and thus the information (words) written in the recommended information table 61-1 is information about music. Herein, the description is made on the assumption that the names of artists are managed.

As described above, the graphs shown in FIGS. 12 to 16 are generated on the basis of actual data, and thus the words managed in the graphs shown in FIG. 12 (recommended information table 61-1) are the names of existing artists (musician, group, etc.). However, the real names of those existing artists cannot be cited for convenience of description, and thus the names are represented by "artist A" and the like in FIG. 12.

Now, description about general evaluation and classification of artists A to F stored in the recommended information table 61-1 shown in FIG. 12 is added. The description added here is general information about artists A to F. The information includes words describing each artist, for example, a genre to which a CD of the artist belongs in a CD shop and an article about the artist.

Artists A and B belong to idol. Artists C and D belong to enka (Japanese ballad) singer. Artists A to D are Japanese. Artists E and F belong to rock or pops and are foreigner. Artists A to F have these features.

As shown in FIG. 12, for example, both of artists A and B are singers belonging to idol, and thus the patterns of distribution of model parameters in semantic classes are similar to each other. Likewise, the patterns of distribution of model parameters are similar between artist C and artist D and between artist E and artist F. On the other hand, artists B and C belong to different genres, so that the patterns of distribution of model parameters thereof are different (not similar).

In this way, the patterns of distribution of model parameters are similar between artists having similarity, whereas the patterns of distribution of model parameters are not similar between artists having no similarity. That is, a word (artist) can be characterized by the pattern of distribution of model parameters.

Figure 13:
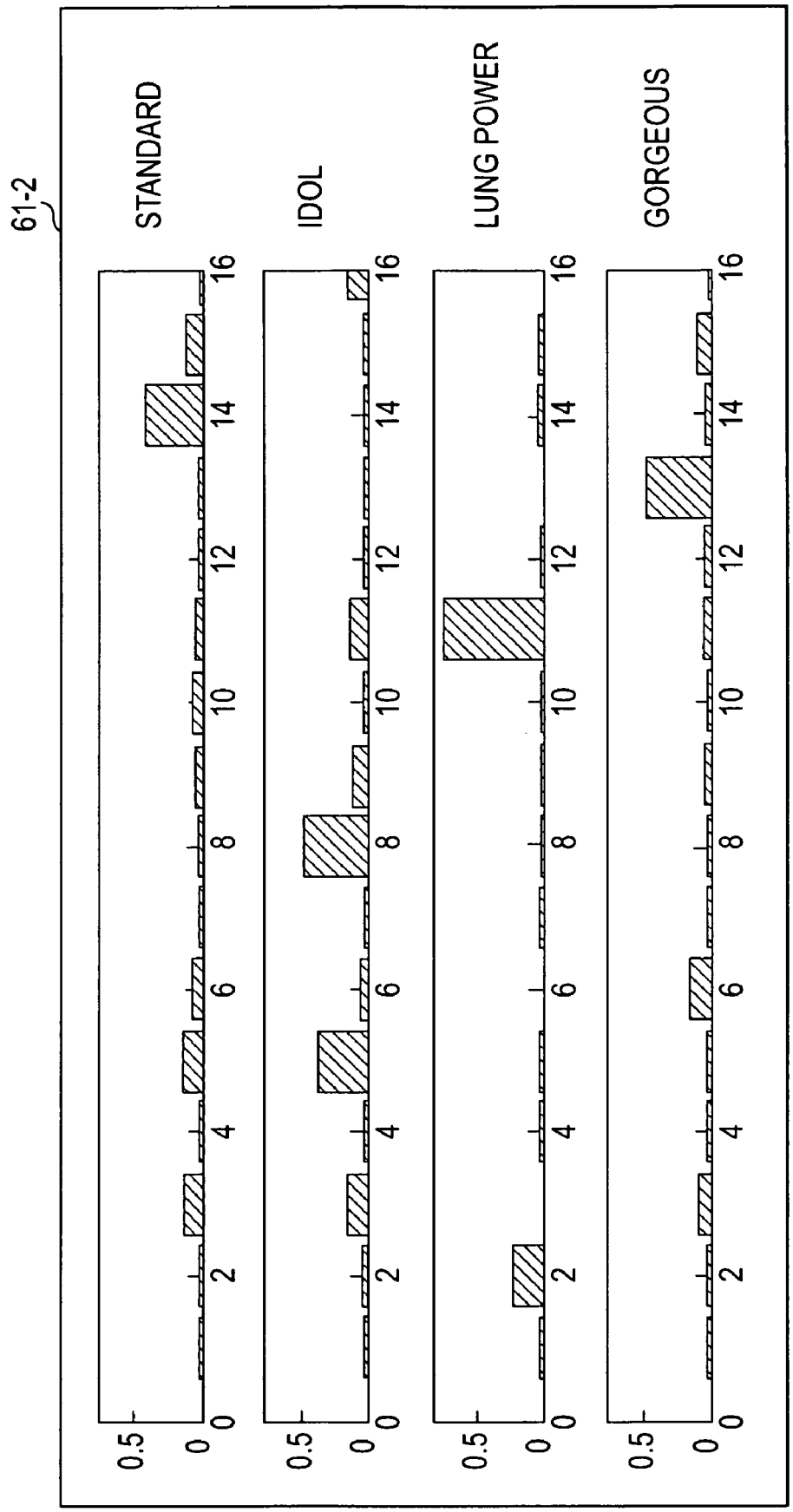
FIG. 13 illustrates a process performed to set recommended information and a reason.

FIG. 13 shows an example of data managed in the recommendation reason table 61-2. The recommendation reason table 61-2 is referred to when a reason why information is recommended to a user is extracted. A plurality of words serving as recommendation reasons are managed in the recommendation reason table 61-2. In the example shown in FIG. 13, four words: "standard", "idol", "lung power", and "gorgeous" are managed.

These four words can also be characterized by the pattern of distribution of model parameters.

Hereinafter, additional description is made about the process of the flowchart shown in FIG. 11 performed in the recommended information providing device 13 shown in FIG. 10 under the following condition: the recommended information table 61-1 shown in FIG. 12 and the recommendation reason table 61-2 shown in FIG. 13 are held in the model parameter holder 12.

After the information obtaining unit 101 obtained information "artist A" from a user in step S31, the distances between the word "artist A" and the respective words stored in the recommended information table 61-1 are calculated in step S32. First, the distance calculating unit 102 obtains the word "artist A" from the information obtaining unit 101, and then reads the model parameters shown in FIG. 14 from the recommended information table 61-1 (FIG. 12) referred to by the table referring unit 103.

Figure 14:
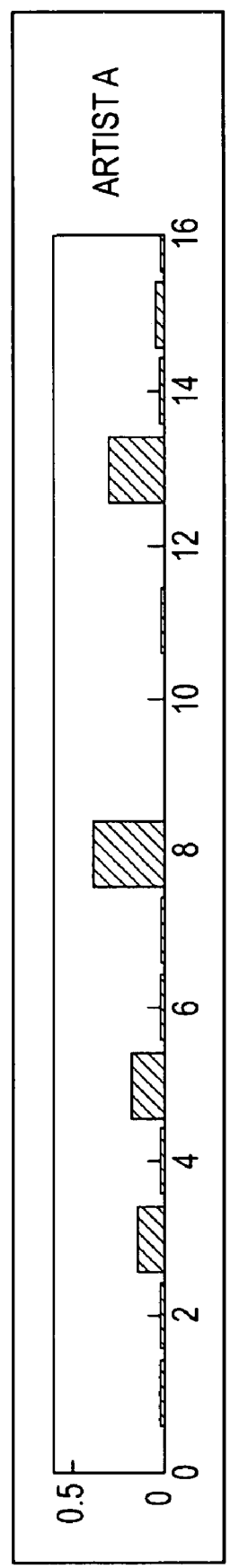
FIG. 14 illustrates a process performed to set recommended information and a reason.

FIG. 14 shows the distribution of model parameters about "artist A". The distance calculating unit 102 calculates the distances between "artist A" and the respective words written in the recommended information table 61-1 by using the model parameters of "artist A" shown in FIG. 14 and the model parameters of the respective words written in the recommended information table 61-1 shown in FIG. 12.

More specifically, distance 1 between "artist A" and "artist B" is calculated, distance 2 between "artist A" and "artist C" is calculated, distance 3 between "artist A" and "artist D" is calculated, distance 4 between "artist A" and "artist E" is calculated, and distance 5 between "artist A" and "artist F" is calculated. Distances 1 to 5 calculated by the distance calculating unit 102 are sequentially supplied to the recommended word extracting unit 104.

A calculation result on similarity to artist A based on actual data is shown below. Incidentally, the value of Kullback-Leibler Divergence in expression (9) is 0 (zero) when both distribution patterns are the same and is larger as the difference therebetween becomes significant. Thus, "$\exp(-D(w_i, w_j))$" is used as similarity in this case.

Similarity between artist A and artist B 5.179e-1
Similarity between artist A and artist C 1.125e-4
Similarity between artist A and artist D 6.378e-6
Similarity between artist A and artist E 4.365e-2
Similarity between artist A and artist F 1.820e-2

The recommended word extracting unit 104 extracts a recommended word in step S33. In this case, the shortest distance among the supplied distances 1 to 5 is extracted, and the word corresponding to the distance is determined to be a recommended word. The distance that is determined to be the shortest corresponds to a word in which the distribution pattern of model parameters has maximum similarity. Therefore, referring to FIG. 12, it is determined that distance 1 between "artist A" and "artist B" is the shortest, and thus "artist B" is extracted as a recommended word.

The information "artist B" extracted in this way is supplied to the providing unit 107, whereas the model parameters of "artist B" are supplied to the common semantic class extracting unit 105. The common semantic class extracting unit 105 is also supplied with the model parameters of "artist A" from the distance calculating unit 102.

Figure 15:
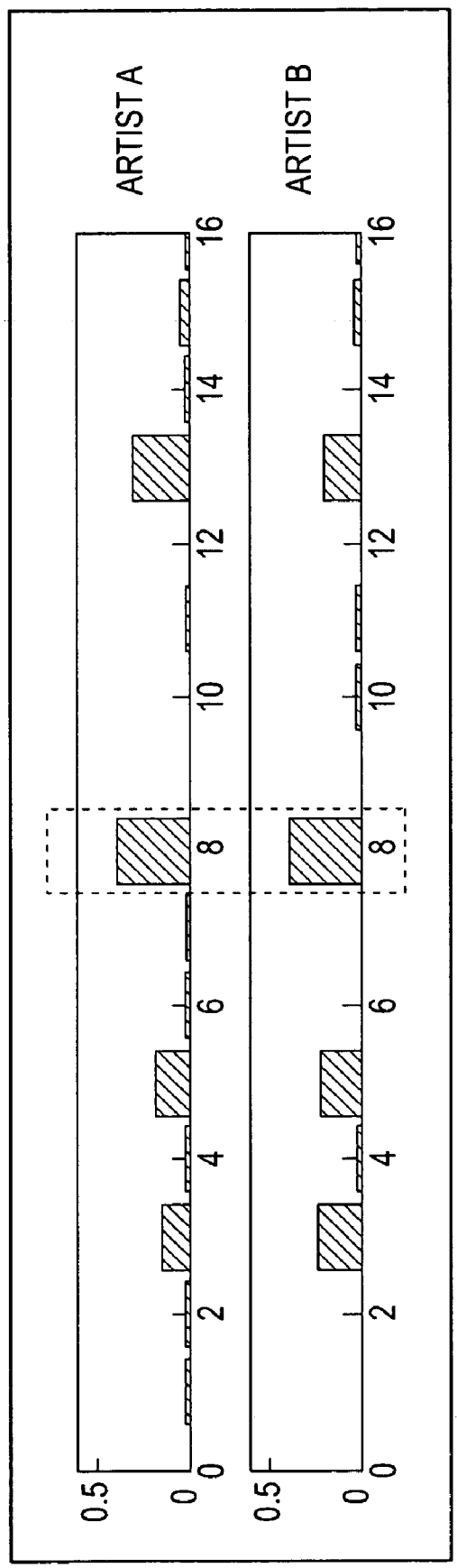
FIG. 15 illustrates a process performed to set recommended information and a reason.

That is, as shown in FIG. 15, the common semantic class extracting unit 105 is supplied with the model parameters of "artist A" and the model parameters of "artist B". The common semantic class extracting unit 105 refers to the distribution patterns of the model parameters of these two words and extracts a semantic class in which the model parameter is high in both words in step S34.

Referring to FIG. 15, among the model parameters of "artist A" and "artist B", values are large in common in semantic class z8 (the part surrounded by a dotted line in FIG. 15). Thus, in this case, the common semantic class extracting unit 105 extracts semantic class z8 as a common semantic class.

When the common semantic class extracting unit 105 performs a process on the basis of the above-described expression (10), the value obtained through the following expression is the maximum. That is, when the following expression: p(semantic class z8|artist A)×p(semantic class z8|artist B), is substituted into the part after "max" in expression (10), the value as a calculation result is the largest among values obtained in calculation on the other semantic classes. Accordingly, semantic class z8 is supplied as a common semantic class to the recommendation reason extracting unit 106.

The recommendation reason extracting unit 106 extracts a recommendation reason in step S35. In this case, the recommendation reason extracting unit 106 is supplied with information of semantic class z8 as a common semantic class. The recommendation reason extracting unit 106 refers to model parameters related to semantic class z8 in the recommendation reason table 61-2 managing data shown in FIG. 13.

Figure 16:
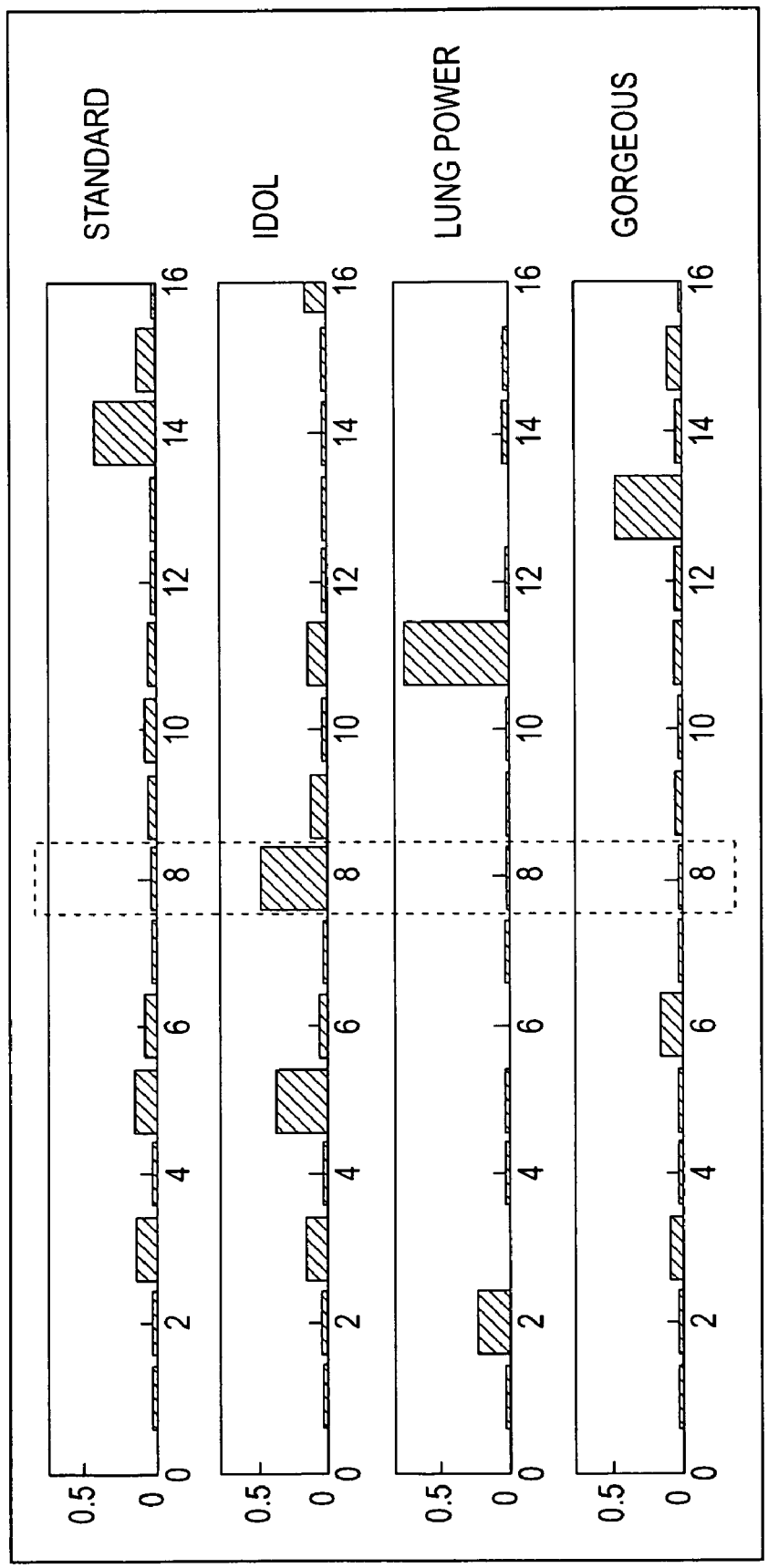
FIG. 16 illustrates a process performed to set recommended information and a reason.

More specifically, referring to FIG. 16, the recommendation reason extracting unit 106 refers to only the model parameters at the part surrounded by a dotted line in the recommendation reason table 61-2. At this time, if the process is performed on the basis of expression (11), the following values are substituted into the part after "max":

p(semantic class z8|standard)
p(semantic class z8|idol)
p(semantic class z8|lung power)
p(semantic class z8|gorgeous).

Then, the respective values are read and a word having the largest value is selected.

In the example shown in FIG. 16, the value of "p(semantic class z8|idol)" is the largest, and thus a word "idol" is selected as a recommendation reason. The information of the word "idol" extracted by the recommendation reason extracting unit 106 is supplied to the providing unit 107.

In this way, "artist B" as recommended information and "idol" as a recommendation reason are supplied to the providing unit 107. The supplied information is presented to the user side after being processed into a message, for example, "Recommended information is "artist B". The reason is that artist B is an "idol" as artist A."

As described above, by applying the present invention, information related to information supplied from the user side can be extracted. The extracted information may be similar to the information supplied from the user side. The similar information is extracted by using a concept of semantic classes, and thus information of higher similarity can be extracted more reliably.

By applying the present invention, a reason why the information is recommended (provided) can also be extracted and presented to the user side. Thus, the user can understand why the information is recommended.

[Other Methods about Extracting Information]

In the embodiment described above with reference to the flowchart shown in FIG. 11 about the process performed by the recommended information providing device 13, information to be recommended is determined by calculating the distances between the information from the user and respective pieces of information written in the recommended information table 61-1 in steps S32 and S33. Then, in steps S34 and S35, a semantic class having a high model parameter of the recommended information and information having a high model parameter in that semantic class are read from the recommendation reason table 61-2, so that a recommendation reason is determined.

That is, in the above-described embodiment, distances are calculated in order to determine information to be recommended, whereas a semantic class having a high model parameter is extracted in order to determine a recommendation reason.

In another embodiment of the recommended information providing device 13, both recommended information and recommendation reason may be determined by calculating distances between words. In that case, information at the shortest distance is determined to be recommended information or recommendation reason. In this method, the same process as the above-described process (steps S32 and S33) is performed to determine recommended information. When a recommendation reason is to be determined, the distances between the recommended information (or information from a user) and respective pieces of information written in the recommendation reason table 61-2 are calculated, and the information at the shortest distance is read from the recommendation reason table 61-2.

Alternatively, in another embodiment of the recommended information providing device 13, both recommended information and recommendation reason may be determined by extracting a semantic class having a high model parameter. In that case, when the recommended information is to be determined, a semantic class of the highest model parameter of information from a user is extracted and then information having a high model parameter in the extracted semantic class is read from the recommended information table 61-1. On the other hand, when a recommendation reason is to be determined, the same process as the above-described process (steps S34 and S35) is performed.

Alternatively, in another embodiment of the recommended information providing device 13, recommended information may be determined by extracting a semantic class of a high model parameter, whereas a recommendation reason may be determined by calculating the distances between words. In that case, when the recommended information is to be determined, a semantic class of the highest model parameter of information from a user is extracted and then information having a high model parameter in the extracted semantic class is read from the recommended information table 61-1. When a recommendation reason is to be determined, the distances between the recommended information and the respective pieces of information written in the recommendation reason table 61-2 are calculated, and the information at the shortest distance is read from the recommendation reason table 61-2.

In another embodiment of the recommended information providing device 13, if information having a high model parameter is used as recommended information or a recommendation reason, information having a model parameter higher than a predetermined threshold may be determined to be recommended information or a recommendation reason.

In the above-described embodiment, a piece of information is supplied from the user, similarity is calculated on the basis of the piece of information, and then recommended information and a recommendation reason are extracted. Typically, when recommendation is made, more appropriate recommended information or recommendation reason can be generated if a plurality of pieces of information are supplied from the user.

By considering this, a method for calculating similarity in a case where a plurality of pieces of information are supplied from a user is described. When a plurality of pieces of information are supplied from a user, the following two methods can be used to calculate similarity: (1) a method of calculating similarities with the respective pieces of user information and obtaining the sum of the similarities; and (2) a method of superimposing distributions of the respective pieces of user information and calculating similarity by using the superimposed distribution.

In method (1), the same similarity calculation and the same process as those performed when one piece of information is supplied from a user are applied to a plurality of pieces of supplied information, and the respective obtained values are accumulated.

In method (2), respective distributions corresponding to the pieces of information from the user are superimposed on each other so as to generate a single distribution, and similarity to the combined distribution is calculated. As a method for superimposing a plurality of distributions, the method described in Japanese Patent Application No. 2004-296473, which has been filed by the applicant of the present application, can be applied. Now, the method described in Japanese Patent Application No. 2004-296473 is briefly described below.

Figure 17:
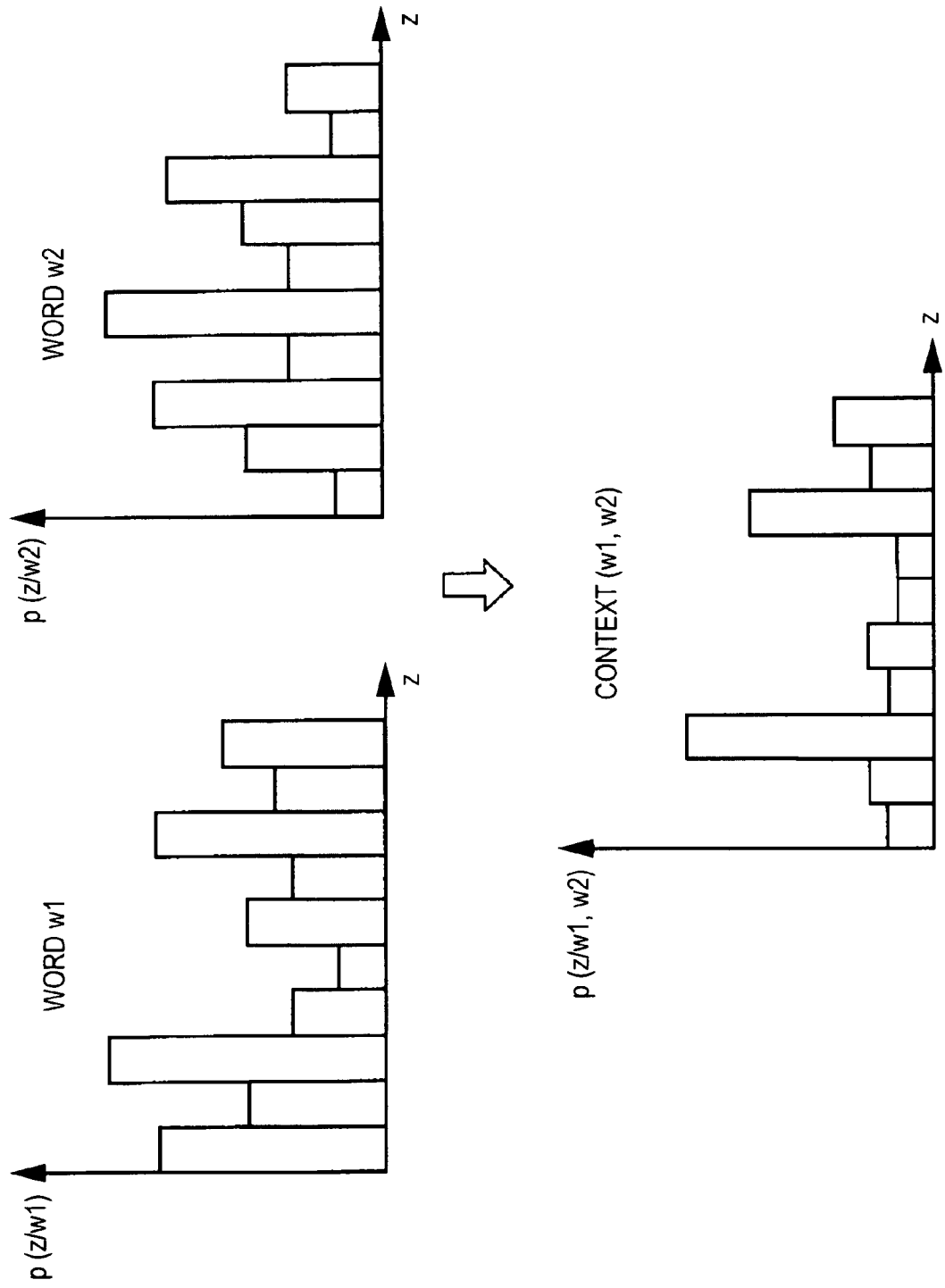
FIG. 17 illustrates superimposing probability distribution patterns.

FIG. 17 illustrates a method for superimposing a plurality of (in this case, two) distributions. On the upper side of FIG. 17, there are shown graphs of probability distribution of respective semantic classes of words w1 and w2 (probability distribution patterns of words w1 and w2) in a case where words w1 and w2 are supplied as information from a user. A graph indicating the combined distribution of words w1 and w2 is shown on the lower side of FIG. 17. The graph on the lower side of FIG. 17 shows the probability distribution pattern of a context (w1, w2). Herein, "context" is used because it includes two words.

The expression "context (w1, w2)" expresses the probability distribution pattern of the context including words w1 and w2. The probability value in its predetermined semantic class z is expressed by "p(z|w1, w2)".

As can be seen in FIG. 17, when a probability distribution pattern of a context is generated by superimposing probability distribution patterns of a plurality of words, the probability distribution pattern of semantic classes of a sentence or sentences including a plurality of words can be obtained on the basis of the probability distribution pattern of semantic classes of each word.

When a context including n words w1, w2, ..., and wn is defined as "h", the probability distribution based on semantic classes can be expressed by the following expression (12).

[Expression 7]

$$P(z|h) = P(z|w1, w2, \cdots, wn) \approx \beta \prod_{i=1}^{n} p(z|wi)^{1/\alpha(w)} \quad (12)$$

$$\beta = 1 \Big/ \sum_{w \in d} \prod_{i=1}^{n} p(z|wi)^{1/\alpha(w)}$$

As can be understood from expression (12), the probability distribution based on semantic classes can be obtained by multiplying occurrence probabilities p(z|w) in semantic classes z in each word. Here, under the assumption that each of words w1, w2, ..., and wn occurs independently, approximation is used to find which distribution of semantic classes is obtained when all of those words occur. Herein, "β" is a normalized coefficient used so that the sum of probability values of all classes becomes 1. "α(wi)" is a weighting factor determined for each word.

Also, when Naive Bayes is used, it is possible to approximate as in the following expression (13).

[Expression 8]

$$p(z|w_1, w_2, \cdots, w_n) \approx \beta p(z) \prod_{i=1}^{n} p(w_i|z) \quad (13)$$

In this way, probability distribution patterns of a plurality of pieces of information (words) supplied from a user are superimposed to generate a single probability distribution pattern, and the single probability distribution pattern is used as the probability distribution pattern of the information supplied from the user in the above-described embodiment. Accordingly, recommended information and a recommendation reason can be extracted by the above-described method.

The procedure of extracting similar recommended information on the basis of a plurality of pieces of user information can also be used to determine a recommendation reason by using both user information and recommended information corresponding thereto. That is, user information and recommended information are expressed in a plurality of distributions, and a recommendation reason is extracted by accumulating similarities or superimposing distributions, as described above.

[Recording Medium]

The above-described series of processes can be executed by hardware having respective functions or software. When the series of processes are executed by software, a program constituting the software is installed through a recording medium into a computer incorporated in a dedicated hardware or into a multi-purpose personal computer capable of executing various functions after being installed with various programs.

Figure 18:
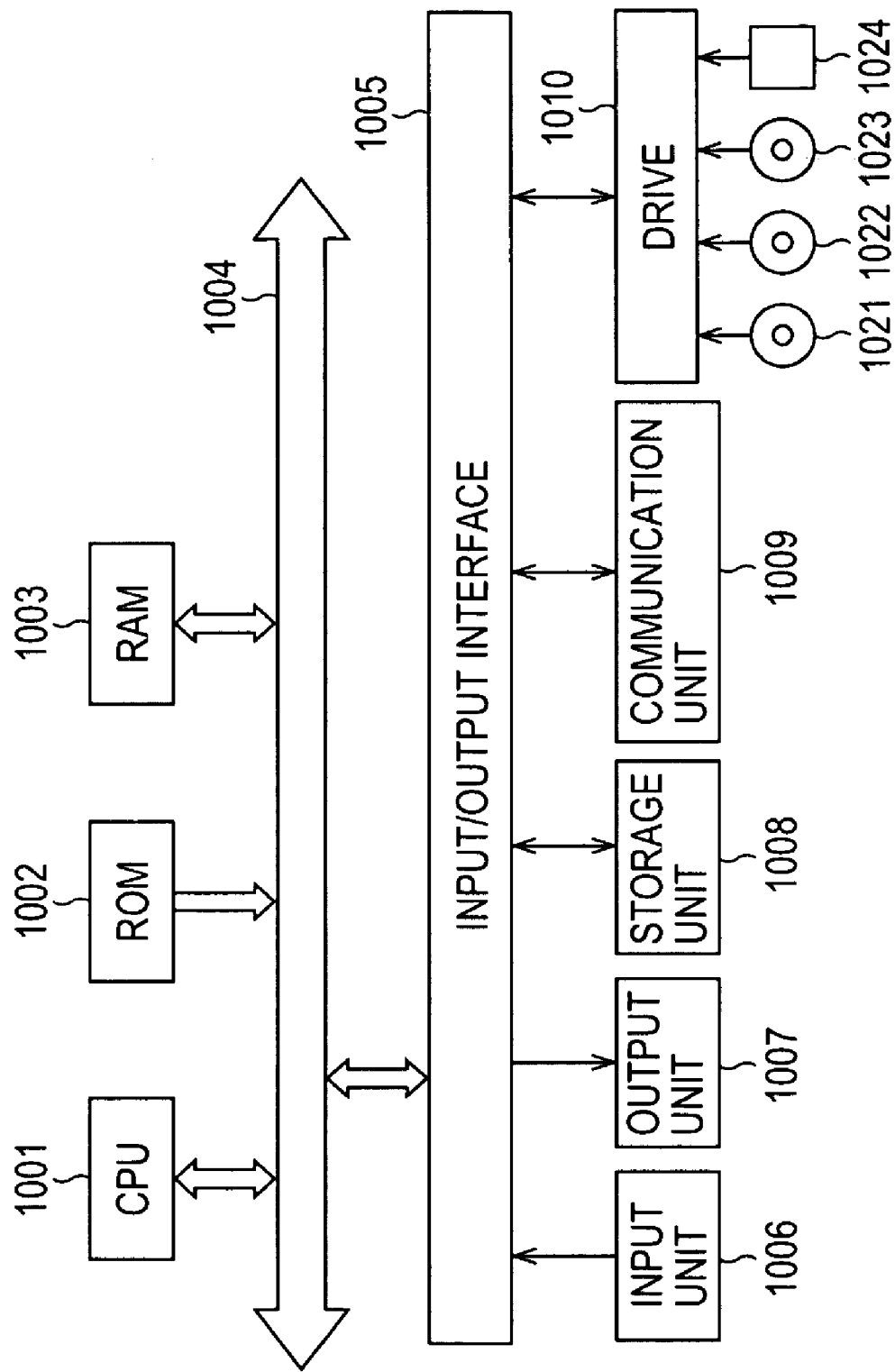
FIG. 18 illustrates media.

FIG. 18 shows an example of an internal configuration of a multi-purpose personal computer. A CPU (central processing unit) 1001 of the personal computer executes various processes in accordance with a program stored in a ROM (read only memory) 1002. Data and programs necessary for the CPU 1001 to execute the various processes are adequately stored in a RAM (random access memory) 1003. An input/output interface 1005 connects to an input unit 1006 including a keyboard and a mouse and outputs a signal input to the input unit 1006 to the CPU 1001. The input/output interface 1005 also connects to an output unit 1007 including a display and a speaker.

Further, the input/output interface 1005 connects to a storage unit 1008 including a hard disk or the like and a communication unit 1009 to transmit/receive data to/from another apparatus through a network such as the Internet. A drive 1010 is used to read/write data from/on a recording medium, such as a magnetic disk 1021, an optical disc 1022, a magneto-optical disc 1023, and a semiconductor memory 1024.

As shown in FIG. 18, the recording medium includes a package medium that is separated from the personal computer and that is distributed to a user to provide the user with a program, such as the magnetic disk 1021 (including a flexible disk), the optical disc 1022 (including a CD-ROM (compact disc read only memory) and a DVD (digital versatile disc)), the magneto-optical disc 1023 (including an MD (Mini Disc®)), or the semiconductor memory 1024 containing a program. Also, the recording medium includes a hard disk that is provided to a user while being incorporated in a computer and that includes the ROM 1002 or the storage unit 1008 storing the program.

In this specification, the steps describing the program provided by a medium may be executed in time series in accordance with the described order or may be executed in parallel or individually.

In this specification, a system means an entire apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, including one or more hardware elements, comprising:
    referring means for referring to a table in which a characteristic of each piece of first information is expressed as a distribution of model parameters in a plurality of semantic classes, in units of pieces of the first information;
    obtaining means for obtaining second information to be searched for;
    calculating means for calculating similarities between the second information and the respective pieces of the first information;
    first reading means for reading the pieces of the first information from the table in descending order of the similarity;
    extracting means for extracting the semantic classes of the first information read by the first reading means; and
    second reading means for reading the pieces of the first information from the table in descending order of model parameter in the semantic classes extracted by the extracting means; and
    updating means for updating a second table by determining whether a word is registered and incrementing an occurrence number associated with the word and associated with a sentence by one,
    wherein, after when data processing is complete, the second table is utilized in calculating the model parameters,
    wherein the first information read by the first reading means is recommended information that is recommended to a user as information related to the second information, and
    wherein the first information read by the second reading means is information provided to the user as a recommendation reason indicating which of the plurality of semantic classes is a reason the recommended information is recommended, and
    wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

2. The information processing apparatus according to claim 1,
    wherein the extracting means extracts the semantic classes in descending order of model parameter of the first information read by the first reading means; and
    wherein the second reading means reads the pieces of the first information from the table in descending order of model parameter in the semantic classes extracted by the extracting means.

3. The information processing apparatus according to claim 1,
    wherein the first reading means calculates similarities between the read first information or second information and the pieces of the first information written in the table and further reads the pieces of the first information from the table in descending order of the similarity.

4. The information processing apparatus according to claim 1,
    wherein, if the obtaining means obtains a plurality of pieces of the second information, the calculating means calculates similarities for the respective pieces of the second information and calculates the sum of the similarities.

5. The information processing apparatus according to claim 1,
    wherein, if the obtaining means obtains a plurality of pieces of the second information, the calculating means superimposes distributions of model parameters corresponding to the pieces of the second information and calculates similarity to the first information by using the superimposed distribution of model parameters.

6. The information processing apparatus according to claim 1,
    wherein the table referred to by the referring means describes only the first information except information that is inappropriate to be presented to the user.

7. An information processing method comprising:
    a step of referring to a table in which a characteristic of each piece of first information is expressed as distribution of model parameters in a plurality of semantic classes, in units of pieces of the first information,
    a step of obtaining second information to be searched for;
    a step of calculating similarities between the second information and the respective pieces of the first information;
    a first reading step of reading the pieces of the first information from the table in descending order of the similarity; and
    a step of providing an output via a display based on the reading step;
    a step of extracting the semantic classes of the first information read by the first reading means; and
    a second reading step of reading the pieces of the first information from the table in descending order of model parameter in the semantic classes extracted by the extracting means,
    wherein the first information read by the first reading step is recommended information that is recommended to a user as information related to the second information, and
    wherein the first information read by the second reading step is information provided to the user as a recommendation reason indicating which of the plurality of semantic classes is a reason the recommended information is recommended, and
    wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

8. A computer-readable medium for storing executable program code, the program code comprising:
    referring to a table in which a characteristic of each piece of first information is expressed as distribution of model parameters in a plurality of semantic classes, in units of pieces of the first information, obtaining second information to be searched for;

calculating similarities between the second information and the respective pieces of the first information; and reading the pieces of the first information from the table in descending order of the similarity;

extracting the semantic classes of the first information read by the first reading means; and reading the pieces of the first information from the table in descending order of model parameter in the semantic classes extracted by the extracting means, wherein the first information read by the first reading step is recommended information that is recommended to a user as information related to the second information, and wherein the first information read by the second reading step is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

9. A computer-readable recording medium for storing a computer-readable program comprising the steps of:

referring to a table in which a characteristic of each piece of first information is expressed as distribution of model parameters in a plurality of semantic classes, in units of pieces of the first information, obtaining second information to be searched for;

calculating similarities between the second information and the respective pieces of the first information; and reading the pieces of the first information from the table in descending order of the similarity;

extracting the semantic classes of the first information read by the first reading means; and reading the pieces of the first information from the table in descending order of model parameter in the semantic classes extracted by the extracting means, wherein the first information read by the first reading step is recommended information that is recommended to a user as information related to the second information, and wherein the first information read by the second reading step is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

10. An information processing apparatus, including one or more hardware elements, comprising:

referring means for referring to a table in which a characteristic of each piece of first information is expressed as distribution of model parameters in a plurality of semantic classes, in units of pieces of the first information, obtaining means for obtaining second information to be searched for;

extracting means for extracting the semantic classes in descending order of model parameter of the second information; and first reading means for reading the pieces of the first information from the table in descending order of model parameter in the semantic classes extracted by the extracting means;

extracting means for extracting the semantic classes of the first information read by the first reading means; and second reading means for reading the pieces of the first information from the table in descending order of model parameter in the semantic classes extracted by the extracting means, wherein the first information read by the first reading means is recommended information that is recommended to a user as information related to the second information, and wherein the first information read by the second reading means is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

11. The information processing apparatus according to claim 10, wherein the reading means extracts the semantic classes in descending order of model parameter of the read pieces of the first information and further reads the pieces of the first information from the table in descending order of model parameter in the extracted semantic classes.

12. An information processing method comprising:

a step of referring to a table in which a characteristic of each piece of first information is expressed as distribution of model parameters in a plurality of semantic classes, in units of pieces of the first information, a step of obtaining second information to be searched for;

a step of extracting the semantic classes in descending order of model parameter of the second information;

a first reading step of reading the pieces of the first information from the table in descending order of model parameter in the semantic classes extracted in the extracting step; and a step of providing an output via a display based on the reading step;

a step of extracting the semantic classes of the first information read by the first reading means; and a second reading step of reading the pieces of the first information from the table in descending order of model parameter in the semantic classes extracted by the extracting means, wherein the first information read by the first reading step is recommended information that is recommended to a user as information related to the second information, and wherein the first information read by the second reading step is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

13. A computer-readable medium for storing executable program code, the program code comprising:

referring to a table in which a characteristic of each piece of first information is expressed as distribution of model parameters in a plurality of semantic classes, in units of pieces of the first information, obtaining second information to be searched for;

extracting the semantic classes in descending order of model parameter of the second information; and reading the pieces of the first information from the table in descending order of model parameter in the semantic classes extracted in the extracting step;

extracting the semantic classes of the first information read by the first reading means; and reading the pieces of the first information from the table in descending order of model parameter in the semantic classes extracted by the extracting means, wherein the first information read by the first reading step is recommended information that is recommended to a user as information related to the second information, and wherein the first information read by the second reading step is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

14. A computer-readable recording medium for storing a computer-readable program comprising the steps of:

referring to a table in which a characteristic of each piece of first information is expressed as distribution of model parameters in a plurality of semantic classes, in units of pieces of the first information, obtaining second information to be searched for;

extracting the semantic classes in descending order of model parameter of the second information; and reading the pieces of the first information from the table in descending order of model parameter in the semantic classes extracted in the extracting step;

extracting the semantic classes of the first information read by the first reading means; and reading the pieces of the first information from the table in descending order of model parameter in the semantic classes extracted by the extracting means, wherein the first information read by the first reading step is recommended information that is recommended to a user as information related to the second information, and wherein the first information read by the second reading step is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

15. An information processing apparatus, including one or more hardware elements, comprising:

a referring unit configured to refer to a table in which a characteristic of each piece of first information is expressed as distribution of model parameters in a plurality of semantic classes, in units of pieces of the first information, an obtaining unit configured to obtain second information to be searched for;

a calculating unit configured to calculate similarities between the second information and the respective pieces of the first information; and a first reading unit configured to read the pieces of the first information from the table in descending order of the similarity;

an extracting unit for extracting the semantic classes of the first information read by the first reading means; and a second reading unit for reading the pieces of the first information from the table in descending order of model parameter in the semantic classes extracted by the extracting means, wherein the first information read by the first reading unit is recommended information that is recommended to a user as information related to the second information, and wherein the first information read by the second reading unit is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

16. An information processing apparatus, including one or more hardware elements, comprising:

a referring unit configured to refer to a table in which a characteristic of each piece of first information is expressed as distribution of model parameters in a plurality of semantic classes, in units of pieces of the first information, an obtaining unit configured to obtain second information to be searched for;

an extracting unit configured to extract the semantic classes in descending order of model parameter of the second information; and a first reading unit configured to read the pieces of the first information from the table in descending order of model parameter in the semantic classes extracted by the extracting unit;

an extracting unit for extracting the semantic classes of the first information read by the first reading means; and a second reading unit for reading the pieces of the first information from the table in descending order of model parameter in the semantic classes extracted by the extracting means, wherein the first information read by the first reading unit is recommended information that is recommended to a user as information related to the second information, and wherein the first information read by the second reading unit is information provided to the user as a recommendation reason indicating which of the plurality of semantic classes is a reason the recommended information is recommended, and wherein the recommendation reason is one of the plurality of semantic classes that is scored as a highest value of similarity between the recommended information and obtained second information when a value for each of the plurality of semantic classes for the recommended information is compared with a value for each of the plurality of semantic classes for the obtained second information.

* * * * *